United States Patent
Perrett et al.

(10) Patent No.: US 11,393,032 B2
(45) Date of Patent: Jul. 19, 2022

(54) SYSTEMS AND METHODS FOR PROVIDING REAL-TIME PRE-TRADE RISK ASSESSMENT

(71) Applicant: Fixnetix Limited, Aldershot (GB)

(72) Inventors: Marcus Perrett, London (GB); Paul Ellis, Great Hinton (GB); Hugh Hughes, London (GB)

(73) Assignee: FIXNETIX LIMITED, London (GB)

( * ) Notice: Subject to any disclaimer, the term of this patent is extended or adjusted under 35 U.S.C. 154(b) by 203 days.

(21) Appl. No.: 16/905,078

(22) Filed: Jun. 18, 2020

(65) Prior Publication Data
US 2020/0320625 A1     Oct. 8, 2020

Related U.S. Application Data

(63) Continuation of application No. 16/248,472, filed on Jan. 15, 2019, which is a continuation of application
(Continued)

(51) Int. Cl.
*G06Q 40/00* (2012.01)
*G06Q 40/04* (2012.01)
(Continued)

(52) U.S. Cl.
CPC ......... *G06Q 40/04* (2013.01); *G06Q 30/0201* (2013.01); *G06Q 40/08* (2013.01);
(Continued)

(58) Field of Classification Search
CPC ........ G06Q 10/00; G06Q 20/00; G06Q 30/00; G06Q 40/00
(Continued)

(56) References Cited

U.S. PATENT DOCUMENTS 7,685,254 B2    3/2010  Pandya
8,296,221 B1 *  10/2012  Waelbroeck ........... G06Q 40/04
                                                                                705/37
(Continued)

FOREIGN PATENT DOCUMENTS

WO    2012088436    6/2012

OTHER PUBLICATIONS

Shack, "The next leap in trading technology", Institutional Investor 34.6: 49-56, Euromoney Institutional Investor PLC, June (Year: 2000).*
(Continued)

*Primary Examiner* — Frantzy Poinvil

(57) ABSTRACT

Systems and methods are disclosed that provide real-time pre-trade risk assessments for multiple parties. In one embodiment, systems and methods can be configured to receive a market order data packet, wherein the market order data packet comprises order information for a market order to be made at a liquidity venue. The market order data packet comprises a header portion and a payload portion, and the header portion comprises at least a portion of the order information. An order symbol is determined based on order symbol information in the header portion. Risk parameters are retrieved associated with the order symbol. It is determined whether or not a risk threshold is exceeded based on the risk parameters and the order information. A final market order data packet is generated for transmission to the liquidity venue based on the determining whether the risk threshold is exceeded.

20 Claims, 21 Drawing Sheets

Related U.S. Application Data

No. 15/222,726, filed on Jul. 28, 2016, now abandoned.

(60) Provisional application No. 62/199,156, filed on Jul. 30, 2015.

(51) Int. Cl.
    *H04L 69/16*     (2022.01)
    *H04L 69/323*    (2022.01)
    *H04L 69/326*    (2022.01)
    *G06Q 30/02*     (2012.01)
    *G06Q 40/08*     (2012.01)
    *H04L 101/622*   (2022.01)
    *H04L 69/22*     (2022.01)

(52) U.S. Cl.
    CPC ........ *H04L 61/6022* (2013.01); *H04L 69/161* (2013.01); *H04L 69/162* (2013.01); *H04L 69/22* (2013.01); *H04L 69/323* (2013.01); *H04L 69/326* (2013.01)

(58) Field of Classification Search
    USPC ...................................................... 705/3–44
    See application file for complete search history.

(56) References Cited

U.S. PATENT DOCUMENTS

| | | |
|---|---|---|
| 8,386,371 B2 | 2/2013 | Kittelsen |
| 9,998,220 B2 | 6/2018 | Aoyama |
| 10,050,869 B2 | 8/2018 | Loveless |
| 2003/0236738 A1 | 12/2003 | Lange |
| 2006/0184447 A1* | 8/2006 | Nieboer ................. G06Q 40/04 705/37 |
| 2009/0186689 A1* | 7/2009 | Hughes .............. G06Q 30/0216 705/14.18 |
| 2011/0080912 A1 | 4/2011 | Grinfeld |
| 2011/0125672 A1 | 5/2011 | Rosenthal et al. |
| 2011/0225081 A1 | 9/2011 | Kittelsen |
| 2012/0166237 A1 | 6/2012 | Oh |
| 2014/0081827 A1 | 3/2014 | Chiulli et al. |
| 2014/0289094 A1 | 9/2014 | Gaber et al. |
| 2015/0106251 A1* | 4/2015 | Farnstrom ............... G06Q 40/04 705/37 |
| 2015/0332398 A1* | 11/2015 | Brkic ..................... G06Q 40/04 705/37 |
| 2016/0371777 A1 | 12/2016 | Perrett |
| 2017/0032462 A1* | 2/2017 | Perrett ................... G06Q 40/08 |
| 2017/0236203 A1 | 8/2017 | Amicangioli |
| 2018/0114267 A1* | 4/2018 | Khatami ................ G06Q 40/04 |
| 2019/0260824 A1* | 8/2019 | Pitio .................... H04L 67/327 |

OTHER PUBLICATIONS

Kola, Kiran, et al., "A Software Architecture Framework for On-Line Option Pricing", Journal of Supercomput., vol. 47, (2009) DOI 10.1007/s 11227-008-182-4, Published online Mar. 21, 2008 (Year: 2008), pp. 146-170.

Thekkath, Chandramohan, et al., "Implementing Network Protocols at User Level", IEEE/ACM Transactions of Networking, vol. 1, No. 5, Oct. 1991, pp. 554-565.

International Application No. PCT/IB2016/001243, International Search Report and Written Opinion dated Nov. 17, 2016.

\* cited by examiner

| Layer | Layer Usage | Layer Usage | | Layer Usage |
|---|---|---|---|---|
| | | | Existing ATS Method of Using the OSI Layers | |
| Layer1:Physical Layer | Ethernet | MAC Address | | |
| Layer2:Data Link Layer | Ethernet | | ARP | |
| Layer3:Network Layer | IP | Destination (PS Recipient) IP Address | | |
| | | Source (ATS Sender) IP Address | | |
| Layer4:Transport Layer | TCP | Transport of Data Packet/Sender Port ID/Destination Port ID | | |
| Layer5:Session Layer | Payload | Full Order Details | | Venue Protocol i.e. OUCH, FIX or Arrowhead etc Used to Detail the Order Elements |
| Layer6:Presentation Layer | Payload | Full Order Details | | |
| Layer7:Application Layer | Payload | Full Order Details | | |

FIGURE 1

| Layer | Layer Usage | | Data Packets as Sent From an ATS – Approach 1 | |
|---|---|---|---|---|
| | | | Layer Usage | New Layer Usage |
| Layer1:Physical Layer | | | | |
| Layer2:Data Link Layer | Ethernet | Ethernet | MAC Address | Symbol Identifier, Within MAC Address |
| Layer3:Network Layer | IP | | Destination (PS Recipient) IP Address | |
| | | | Source (ATS Sender) IP Address | ARP |
| Layer4:Transport Layer | TCP | | Transport of Data Packet/Sender Port ID/Destination Port ID | |
| Layer5:Session Layer | Payload | | Full Order Details | |
| Layer6:Presentation Layer | Payload | | Full Order Details | Venue Protocol, e.g., OUCH, FIX, Arrowhead, etc Used to Detail the Order Elements |
| Layer7:Application Layer | Payload | | Full Order Details | |

FIGURE 6

Data Packets as Sent From an ATS – Approach 2

| Layer | Layer Usage | Layer Usage | New Layer Usage |
|---|---|---|---|
| Layer 1: Physical Layer | Ethernet | MAC Address | Symbol Identifier, Direction (B/S) & Sub Account Within MAC Address |
| Layer 2: Data Link Layer | Ethernet | Destination (PS Recipient) IP Address | |
| Layer 3: Network Layer | IP | Source (ATS Sender) IP Address | |
| Layer 4: Transport Layer | TCP | Transport of Data Packet/Sender Port ID/Destination Port ID | Sender Port: Amount    Destination Port: Price |
| Layer 5: Session Layer | Payload | Full Order Details | Venue Protocol i.e. OUCH, FIX or Arrowhead etc Used to Detail the Order |
| Layer 6: Presentation Layer | Payload | Full Order Details | |
| Layer 7: Application Layer | Payload | Full Order Details | |

(ARP shown spanning Layer 2-3 area)

FIGURE 8

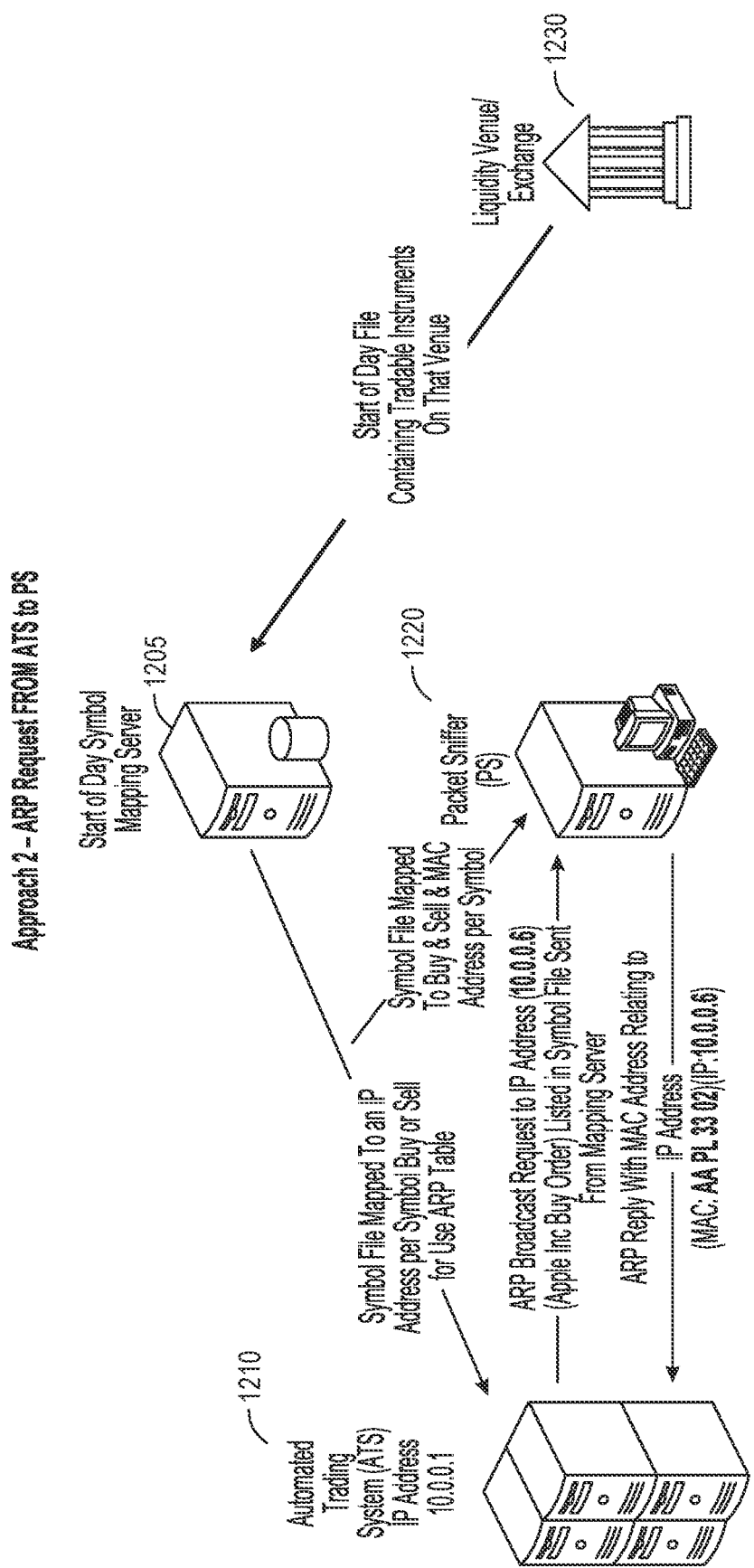

Approach 2 – Assigned MAC Address Configuration

| Symbol Identifier | | | Additional Space for Symbol Identifier (If not Required Octet Would be Used for Account ID) | Account Number per PS (0-99) i.e. Account No '33' (If Symbol Identifier Was Four Characters This Octet Would be Used for Trade Direction) | Buy/Sell Indicator (Even/Odd) i.e. 'Sell' (This Detail Would Shift Left If Symbol Identifier Four or Less Characters) | Unused |
|---|---|---|---|---|---|---|
| A A | P | L | 00 | 33 | 02 | 00 |

FIGURE 13

Approach 1 – Symbol to IP and MAC Address Conversion Table

| Stock Name | Venue Symbol | Assigned IP Address | Assigned MAC Address |
|---|---|---|---|
| Amazon | AMZN | 10.0.0.4 | AM ZN |
| Apple | AAPL | 10.0.0.5 | AA PL |
| Cisco | CSCO | 10.0.0.6 | CS CO |
| Microsoft | MSFT | 10.0.0.7 | MS FT |
| ⇩ | ⇩ | ⇩ | ⇩ |
| ZUMIEZ Inc | ZUMZ | 10.0.30.37 | ZU MZ |
| NASDAQ Test Stock | ZXZZT | 10.0.30.38 | ZX ZZ T |

FIGURE 14

Approach 2 – Symbol to IP and MAC Address Conversion Table NASDAQ Exchange

| Stock Name | Venue Symbol | Assigned IP Address | Assigned MAC Address | Buy/Sell Direction |
|---|---|---|---|---|
| Amazon | AMZN | 10.0.0.4 | AM ZN 33 02 | Buy |
| Amazon | AMZN | 10.0.0.5 | AM ZN 33 01 | Sell |
| Apple | AAPL | 10.0.0.6 | AA PL 33 02 | Buy |
| Apple | AAPL | 10.0.0.7 | AA PL 33 01 | Sell |
| Cisco | CSCO | 10.0.0.8 | CS CO 33 02 | Buy |
| Cisco | CSCO | 10.0.0.9 | CS CO 33 01 | Sell |
| Microsoft | MSFT | 10.0.0.10 | MS FT 33 02 | Buy |
| Microsoft | MSFT | 10.0.0.11 | MS FT 33 01 | Sell |
| ZUMIEZ Inc | ZUMZ | 10.0.60.38 | ZU MZ 33 02 | Buy |
| ZUMIEZ Inc | ZUMZ | 10.0.60.39 | ZU MZ 33 01 | Sell |
| NASDAQ Test Stock | ZXZZT | 10.0.30.38 | ZX ZZ T | Buy or Sell |

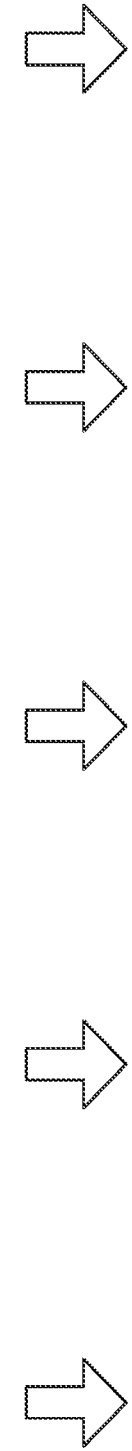

FIGURE 15

Standard Arrowhead Packet Using Approach 2 for Order Inspection

| Ethernet<br>14 Bytes | IP<br>28 Bytes | TCP<br>24 Bytes | Payload of Single Order<br>(Tokyo Stock Exchange<br>Arrowhead Protocol)<br>75 Bytes | Checksum |
|---|---|---|---|---|
| OSI<br>Layer 1 & 2 | OSI<br>Layer 3 | OSI<br>Layer 4 | OSI<br>Layer 5 - 7 | C/S |
| Symbol<br>Direction<br>Sub-Account | | • Price<br>• Amount of<br>• Shares | | |

← Packet Size for Order Inspection as per Approach 2 = 66 Bytes →

FIGURE 19

SYSTEMS AND METHODS FOR PROVIDING REAL-TIME PRE-TRADE RISK ASSESSMENT

CROSS-REFERENCE TO RELATED APPLICATIONS

This application is a continuation of U.S. application Ser. No. 16/248,472, filed on Jan. 15, 2019, which is a continuation of U.S. patent application Ser. No. 15/222,726, filed on Jul. 28, 2016, which claims priority to U.S. Provisional Application No. 62/199,156, filed on Jul. 30, 2015, which are all incorporated herein by reference.

FIELD OF THE INVENTION

The present disclosure relates to systems and methods for assessing trade risk in real-time.

BACKGROUND

Various systems are commercially available to financial market participants and their clients that provide some combination of pre- and post-trade risk assessments, real-time market data and also trading connectivity to numerous liquidity venues. Liquidity venues can list financial instruments such as, for example, securities, options, futures, commodities and foreign exchange. The aim of such systems is generally to provide financial market trading participants with the fastest available electronic market data and trading connectivity to liquidity venues, while also providing intra-day trading risk assessments for both the participant and also their own electronically connected trading clients.

SUMMARY

Various embodiments of the present disclosure can include systems, methods, and non-transitory computer readable media configured to receive a market order data packet, wherein the market order data packet comprises order information for a market order to be made at a liquidity venue. The market order data packet comprises a header portion and a payload portion, and the header portion comprises at least a portion of the order information. An order symbol is determined based on order symbol information in the header portion. Risk parameters are retrieved associated with the order symbol. It is determined whether or not a risk threshold is exceeded based on the risk parameters and the order information. A final market order data packet is generated for transmission to the liquidity venue based on the determining whether the risk threshold is exceeded.

In an embodiment, the header portion comprises an assigned MAC address, and the assigned MAC address comprises the order symbol information.

In an embodiment, the generating the final market order data packet comprises replacing the at least the portion of the order information in the header portion with liquidity venue address information.

In an embodiment, the order information is retrieved from the payload portion and the order symbol is determined based on order symbol information in the header prior to the order information being retrieved from the payload portion.

In an embodiment, the header portion further comprises at least one of order direction information, order price information, and order amount information.

In an embodiment, the header portion comprises an assigned MAC address, and the assigned MAC address comprises the order symbol information and the order direction information.

In an embodiment, the header portion comprises customized TCP port information, and the customized TCP port information comprises the order amount information and the order price information.

In an embodiment, the assigned MAC address further comprises sub-account information In an embodiment, a conversion table file is received comprising a plurality of order symbols associated with a plurality of assigned MAC addresses.

It should be appreciated that many other features, applications, embodiments, and/or variations of the disclosed technology will be apparent from the accompanying drawings and from the following detailed description. Additional and/or alternative implementations of the structures, systems, and methods described herein can be employed without departing from the principles of the disclosed technology.

BRIEF DESCRIPTION OF THE DRAWINGS

FIG. 1 illustrates an example OSI model data packet.

FIG. 6 illustrates an example market order data packet structure, in accordance with an embodiment of the present disclosure.

FIG. 8 illustrates an example market order data packet structure, in accordance with an embodiment of the present disclosure.

FIG. 12 illustrates an example pre-trade risk check system, in accordance with an embodiment of the present disclosure.

FIG. 13 illustrates an example assigned MAC address, in accordance with an embodiment of the present disclosure.

FIG. 14 illustrates an example conversion table for stock symbols, in accordance with an embodiment of the present disclosure.

FIG. 15 illustrates an example conversion table for stock symbols, in accordance with an embodiment of the present disclosure.

FIG. 19 illustrates an example market order data packet structure, in accordance with an embodiment of the present disclosure.

Figure 2:
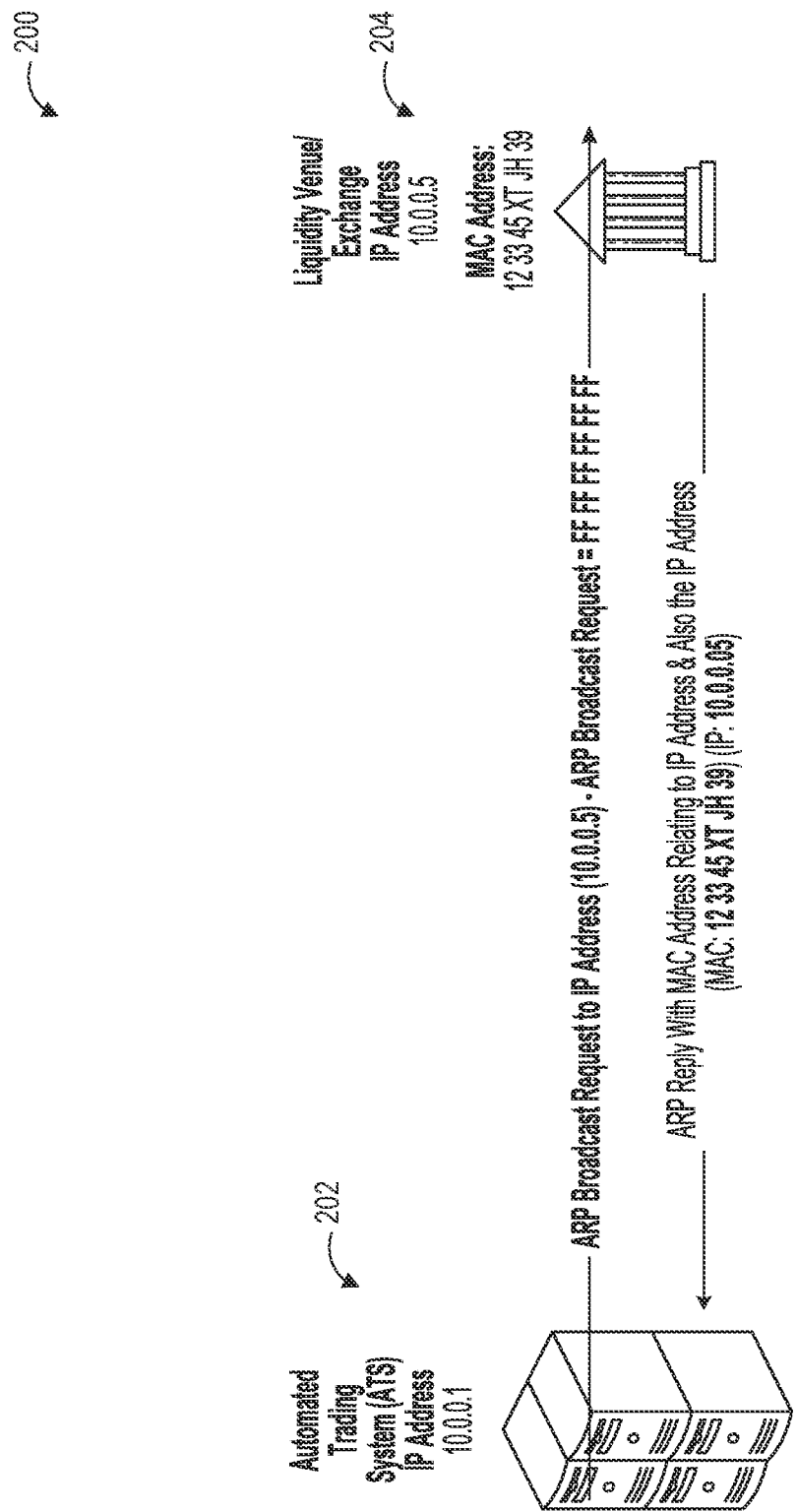
FIG. 2 illustrates an example scenario associated with retrieving a device MAC address utilizing the Address Retrieval Protocol (ARP).

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Real-Time Pre-Trade Risk Assessment

The present disclosure is particularly applicable to Programmable Logic Device (PLD) microchip embedded risk assessment systems and methods and it is in this context that the disclosure will be described. It will be appreciated, however, that the system and method has greater utility beyond the examples provided, as the embedded system may be implemented in other architectures, with other embedded systems and implementations and/or in other manners than those disclosed below, but that which are within the scope of the disclosure.

In 2010, US regulators attempted to put controls in place governing the practice of "naked access," which is the ability for non-exchange member firms to trade on a stock exchange using a member broker's ID but without the use of any pre-trade risk checks. The aim of the regulators was to increase visibility. Regulators sought to improve the identification of trading activities by various participants. Regulators also sought to ensure that non-member firms trading via a member broker could not spend more than their allowed trading limit and that parties could not enter erroneous orders into a market that could subsequently cause wide scale disruption and also potentially put the firm entering the order at financial risk.

Accordingly, legislation commonly known as Dodd-Frank, along with SEC directive 15c3, were both published and released with the aim of compelling brokers to instigate controls between their clients' order flows and the exchange. Such broker/clients often utilized trading strategies via computerized automated trading systems ("ATS") that relied on the lowest latency pathways possible. As such, any pre-trade risk system ("PTRS") that was to be installed between them and the exchange was required to be a fast as possible. Latency is seen as vital to participants because it has a direct effect upon the success or failure of their trading strategy. In terms of a pre-trade risk system, latency on current systems is generally measured in milliseconds (ms), microseconds (us) or nanoseconds (ns). Regardless of the measurement type used, latency in a pre-trade risk system can generally be defined as the time taken to complete all of the following tasks:

1. read orders emanating from an order generating source (such as an ATS);
2. check the validity of the orders from a perspective of potential risk exposure; and
3. depending on the validity check, either allow the orders to pass back to the transit route to the market venue, or for an order cancellation or notification message to be generated and sent back to the order generating source (e.g., the ATS).

Three prevalent methods for providing pre-trade risk checks in financial markets have become visible since 2010: (1) software-based systems, (2) embedded hardware-based systems, and (3) packet sniffer-based risk systems (or "PS systems").

In terms of their relative latency performance in providing pre-trade risk checks, software-based solutions are generally the slowest of the three, while PS systems generally provide the fastest latencies currently available. Embedded hardware-based systems are generally designed to provide the same full range of aggregated pre-trade risk calculations as appear within software-based systems and are therefore generally slower than PS systems, which are generally designed to only prevent errors in a particular order, e.g., errors in an order's size, direction, and/or amount, etc. Although PS systems can use similar types of hardware as utilized by embedded hardware-based systems (e.g., hardware cards known as Frame Programmable Gate Arrays (FPGAs)), they are able to provide better latency performance than embedded hardware-based systems and software-based systems because they perform risk checking via a different method of interaction with the order flows.

Current software-based and hardware-based systems are both designed around a concept that they are sent all orders by the broker/client for pre-trade checking. Generally, the software-based or hardware-based systems are the distinct destination for the potential orders. This means that the software-based or hardware-based system can alone decide whether to forward the order to a particular market venue or to prevent its submission. Furthermore, both software-based and hardware-based systems have been designed to perform a full range of risk checks including aggregated intraday risk checks.

In contrast, PS systems are not specifically sent every order by the client/broker with a view to checking its validity. Instead, PS systems are generally designed to monitor the transit routes (e.g., copper or optical fiber links) between a client/broker generating an order and the market venue to which the order is being sent. When an order is sent from the client/broker to the market venue, the PS system picks up the order from the transit route to interrogate the data packet containing the market order and checks its validity against a pre-defined set of risk criteria. Secondly, PS systems are generally only designed to check for erroneous orders. This contributes to PS systems being faster than software-based or hardware-based systems because they do not have to maintain the state of existing orders in order to provide intra-day risk calculations. PS systems generally do not communicate with the downstream liquidity venue in order to update the status of each order that has been deemed valid for risk and forwarded to the downstream liquidity venue. When preventing erroneous orders from reaching a liquidity venue, packet sniffers can operate via two separate methods.

The first method, commonly known as the Order Corruption Method, involves the PS system corrupting any trade order message determined to be invalid by the PS system's risk assessment so that it is rejected by the downstream liquidity venue. This rejection method adds zero additional latency to the overall latency involved when inspecting the order. Consequently, the overall latency of this first method (the minimum possible latency of inspecting the order) is defined as the time taken to convert the order from an optical signal (as delivered over the optical cable being inspected), to an electrical signal that can be read by the PS system and then back to an optical signal for transit to the liquidity venue.

The second method, commonly known as Order Symbol Substitution, involves the PS system substituting a stock identifier (or stock symbol) of a risk invalid trade order with that of a "test" symbol identifier. Test symbols are defined as symbols that market participants can use to test the integrity of their ATS connectivity to the liquidity venue and, accordingly, do not result in valid trade executions. The second method, however, does add latency to the order inspection process, which is generally estimated to be approximately 50% above that of the Order Corruption method.

Therefore, when each current pre-trade risk system method is compared for its latency performance to provide a pre-trade risk check on a single order, the typical results could be as follows:

1. Packet Sniffer (Order Corruption Method)=approximately 250 ns
2. Packet Sniffer (Symbol Substitution Method)=approximately 375 ns
3. Hardware-Based System=approximately 1-2 us
4. Software-Based System=approximately 50 us to 5 ms (depending upon the application)

Consequently, Order Corruption PS systems achieve a latency figure of approximately 250 ns which is at least 33% faster than the best Symbol Substitution PS systems. Moreover, an Order Corruption PS system is at least 4 times faster than the best hardware-based solution or 200 times faster than the best software-based pre-trade risk solutions. It is generally the case, therefore, that Order Corruption PS systems are able to risk check for erroneous orders much more quickly than any other current commercially available PTRS.

However, there are a number of issues concerning the use of Order Corruption PS systems for performing pre-trade risk checks. For example, the activity of sending a corrupted message to a market venue in order to prevent the entry of an erroneous order is not without its own consequences. This is because, upon receipt of a corrupted message, the market venue will automatically disconnect the user's trading session in order to preserve the integrity of the trading venue itself. This can result in two potential outcomes:

I. The broker/client is disconnected from the venue and is left unable to interact with any other valid orders that they might have previously submitted to the venue and they are left equally unable to send any further orders until the session connection is re-established.

II. The broker/client experiences what is known as a 'cancel on disconnect' scenario whereby the trading venue will automatically cancel all orders previously sent by that trading session, even if they are valid within the order book. The broker client will equally be unable to send any further orders until the session is re-established.

In either scenario, the broker/client is left without a live trading session and is either unable to access their existing orders or will have their entire order book cancelled by the market venue. Secondly, by sending a deliberately corrupted message to the market venue, the broker/client is not acting in a manner which should be encouraged. They are not performing a graceful interaction with either the market venue nor the trading participant that sent the erroneous order, and are relying on the trading venue to react to their deliberately corrupted message in order to prevent a potentially catastrophic event occurring within a market venue. Specifically the broker/client is knowingly sending an order to a market venue without any intention of having the order executed.

The presently disclosed technology overcomes the foregoing and other disadvantages associated with conventional approaches. In certain embodiments, the present disclosure provides systems and methods for operating Symbol Substitution PS systems that would reduce their operational latency to equal that of an Order Corruption PS system. As such, Symbol Substitution PS systems, which are generally safer and provide for a more desirable interaction between a trading system and a liquidity venue, can be utilized while achieving the same operation latency of an Order Corruption PS system.

The new systems and methods described herein are based upon an understanding that the latency of a Symbol Substitution PS system is a product of the amount of data that it must read within the data packet before it can determine whether an order is valid or has breached its risk limits. It is also based upon knowledge of how orders are structured by automated trading systems into data packets that can be subsequently analyzed in transit by PS systems. The method also takes into account the different data protocols employed by liquidity venues, to the extent that it removes the latency impacts of operating different exchange protocols when sending orders to an exchange. The present disclosure includes systems and methods for structuring and analyzing data packets so that an Order Substitution PS system can operate with optimal latency efficiency.

In order to provide an explanation of the improved PS risk checking systems and methods described herein, it is necessary to understand how automated trading systems generate orders to send to a liquidity venue and also how these orders are checked for pre-trade risk. Accordingly, this explanation requires in-depth analysis of available methodologies, including the protocols utilized to communicate order flows and also the way in which PS systems are able to inspect these flows.

In a typical instance of an automated trading system utilizing an Ethernet link as the transit route to a liquidity venue, the ATS submitting the orders will first have to open up a network connection to the liquidity venue in order to send its generated orders. This is achieved through a combination of the following network protocols:

Ethernet
Internet Protocol (IP)
Transmission Control Protocol (TCP)

The use of these protocols is common across nearly all computer/networking systems as they each represent one or more layers of the Open Systems Interconnection (OSI) model. The OSI model is defined as a conceptual model that details and adds standards to the communication functions inherent within current telecommunications and computing systems. The OSI model is made up of seven layers as listed below and depicted in FIG. 1.

Layer 1: Physical Layer
Layer 2: Data Link Layer
Layer 3: Network Layer
Layer 4: Transport Layer
Layer 5: Session Layer
Layer 6: Presentation Layer
Layer 7: Application Layer The Ethernet, TCP and IP protocols utilized by an ATS are represented across layers 1-4, as shown in FIG. 1. However, it should be noted that within the OSI model, some protocols can exist on more than one level. For example, in the example shown, Ethernet covers both Layer 1 and Layer 2. The order output from the ATS application (i.e., the order and the data protocol of the downstream liquidity venue) is represented by layers 5-7, which are typically known as the payload data layers of the OSI model. An explanation of the OSI model and where the current network protocols exist within its hierarchy will now be provided to aid in understanding the improved Symbol Substitution PS systems and methodologies described herein.

Ethernet

Ethernet is defined as a datalink layer protocol within the TCP/IP stack and is used to detail how data is published for transmission to other devices on a local network (LAN). In the OSI model, it straddles both layer 1 (physical) and also layer 2 (datalink). Ethernet details two unit methods for transmission: (1) packet and (2) frame. A frame includes the addressing information of the data that is being transmitted using the Media Access Control (MAC) address of the sender and recipient, along with the payload itself (as described by the application). Each frame within Ethernet is wrapped within a packet that also contains additional information used to establish the connection between devices and also detailing the start and end of frame data.

In an example scenario in which the liquidity venue is located within the same LAN as the ATS, the ATS may first need to resolve the network address of the liquidity venue. To achieve this, the ATS would need to specifically resolve the dynamically assigned IP and fixed MAC address of the target liquidity venue. A MAC address is defined as a unique identifier assigned to network interfaces (or network adaptors) for communications on the physical network segment. MAC addresses are therefore used as a network address for most network technologies, including Ethernet and Wi-Fi. In the case of a liquidity venue, the MAC address to be used by the ATS would likely be the MAC address of a network switch or perhaps server hardware being used by the liquidity venue. The MAC address is assigned to the network interface of the liquidity venue and is then used to control the network communication to and from the network interface card (NIC) or the corresponding ATS submitting orders. However, in order to resolve the MAC address of the liquidity venue, the ATS must first utilize another separate protocol known as the Address Resolution Protocol (ARP).

ARP

As mentioned above, network adaptors are generally manufactured with a fixed, physical address embedded in the hardware, i.e., the MAC address. Hardware manufacturers are careful to ensure that each of these addresses is unique. The Ethernet protocol relies on these unique identifiers for message delivery. Therefore, at the point at which a device (e.g., an ATS) wishes to send data to another target device over Ethernet (e.g., an order to a liquidity venue), it must first determine the MAC address of that target and also its IP address. These IP-to-MAC address mappings are derived from what is known as an ARP Table Cache, which are tables maintained on each software device within a LAN. However, if the given IP address of the target host does not appear in the ATS ARP Cache with a corresponding MAC address, the initiating device (e.g., the ATS) cannot direct messages to that target (e.g., the liquidity venue) until it obtains a new mapping. To do this, the initiating device (e.g., the ATS) first sends an ARP request broadcast message on the local subnet to the IP address of the target liquidity venue. This is shown in FIG. 2, which depicts an example scenario 200 in which an ATS 202 is attempting to direct messages to a liquidity venue 204. The ATS 202 sends an ARP request broadcast message on the local subnet to the IP address of the liquidity venue (i.e., 10.0.0.5). The host (the liquidity venue 204's network device) with the given IP address sends an ARP reply in response to the broadcast request. The ARP reply will contain the MAC address of the target host along with its IP address (this IP address is already known by the system initiating the ARP), thus allowing the initiating device (the ATS 202) to update its cache and proceed to deliver messages directly to the target (the liquidity venue 204).

In essence, ARP is a protocol for mapping an Internet Protocol address (IP address) to a physical machine address that is recognized in the local network (e.g., a MAC address). For example, in the most common level of Internet Protocol in use today (IP 4), an address is 32 bits long. However, in an Ethernet local area network the addresses for attached devices (i.e., the MAC addresses) are 48 bits long. The ARP cache table is therefore used to manage a correlation between each MAC address and its corresponding IP address. ARP as a protocol provides the rules for creating this correlation and providing address conversion in both directions between respective hosts.

Through use of the ARP, once the ATS knows the IP and MAC address of its target (the liquidity venue), it is then able to utilize the Ethernet as part of its subsequent order message delivery and, accordingly, it has no need to utilize ARP again. ARP as a protocol therefore provides the Ethernet protocol with the initial information that it requires by detailing the target host's physical network identity. This is in order to provide the Ethernet with details required to open up a physical and datalink connection for the sending of orders from the ATS to the liquidity venue. ARP is not specifically mentioned in the OSI model but it is generally agreed that it straddles between layer 2 (Datalink) and layer 3 (Network).

TCP

TCP is one of a number of core protocols of the Internet Protocol Suite. TCP sits at layer 4 in the OSI model. Essentially, TCP provides reliable, structured, and error-checked delivery of data between applications running on hosts communicating over an IP network. In the example here listed, it provides one of the protocols for sending messages between the ATS and the downstream liquidity venue. Essentially, TCP provides a communication service at an intermediate level between an application program (e.g., an ATS) and the IP at the transport layer. In essence, the protocol handles all handshaking and transmission details and presents an abstraction of the network connection to the ATS application. TCP as a protocol has primarily been designed and optimized to provide guaranteed delivery of information rather than time latency efficiency. Consequently, TCP guarantees data delivery and also ensures that if there are multiple packets making up a message that these packets are delivered in the same order in which they were sent via the use of sequence numbers. However, it should be noted that in the case of an order being sent from an ATS to a liquidity venue, one single packet of data can contain up to 1500 Bytes and is normally large enough to contain all the data that details a single order message as required by a liquidity venue.

IP

The IP layer is the actual routing method by which data (in this case an order message generated by an ATS) is sent between the ATS and the downstream liquidity venue. The IP protocol does not maintain any connection between hosts on a network. Instead, it provides the transport layer, rather than the rules of transportation. In the case of the ATS sending order messages to a downstream liquidity venue, the IP layer is responsible for the transport of the message. However, it does not guarantee delivery which is the responsibility of the TCP protocol. IP sits within layer 3 of the OSI model. The TCP and IP protocols, when combined together, provide the de-facto standard and basis of global Internet traffic.

Network Stack

The Ethernet, IP and TCP protocols all form part of what is termed the "Network Stack." The Network Stack is defined as a general and non-specific term for listing the many protocols included in the OSI model and also to TCP/IP stack protocols which make up many of the layers of the OSI concept. The combined use of these three protocols as part of the Network Stack allows the initial network connection between the ATS and the liquidity venue to be established and also enables the subsequent transmission of orders from the ATS to the venue and in turn for acknowledgements and rejections to be sent in reverse by the liquidity venue. With regard to a PS system interrogating order traffic from an ATS to a downstream liquidity venue, these protocols assist the PS system in inspecting the order flow because each data packet will be uniform in structure and thus allow the continuous inspection of the daily order flow. In other words, the PS system will know precisely how each order will be formed by the ATS and, accordingly, it will know precisely how and where to find the market order information contained within it. Consequently, once the initial network connection has been established between the ATS and the downstream liquidity venue, the PS system will be able to inspect any subsequent order flows.

Current Symbol Substitution PS System Risk Check Example

As an example of a current Symbol Substitution PS system analyzing pre-trade risk, an order could be sent to a liquidity venue by an ATS with an erroneous price of $500 per share when the current market price is $50 per share. This should normally trigger an order rejection by the PS system. In such a scenario, if a current PS system was performing correctly, it would generally operate in the following fashion:

First, in the instance of a PS system inspecting an optical fiber link, the PS system will first convert the optical signals into electrical signals so that it can analyze the data within each packet. It will then monitor the line in real-time and note when a packet of data is being sent. As has been stated, in the case of an ATS sending orders to a liquidity venue, one single packet would generally contain the entire order details.

Accordingly, upon seeing a packet potentially containing a new market order, the PS system will be pre-programmed to then expect a number of elements making up the data packet. It is worth noting that most network packets contain two types of data: (1) Control Information (information pertaining to the delivery of the data packet and as controlled by the protocols within the network stack) and (2) System User data known as the "payload." These two types of data are split into three distinct parts within the data packet. The three parts are defined as follows:

I. The Header. The header contains information about the data carried within the packet. This information might potentially include:
 1. MAC Address
 2. Destination IP address
 3. Originating IP address
 4. Length of packet
 5. Destination Port Address
 6. Sender Port Address
 7. Protocol (e.g., Ethernet)
 8. Packet number (which packet this is in a sequence of packets—generally not applicable in this case as PS systems do not split orders amongst multiple packets)

II. The Payload. The payload is also known as the body or user data. The payload can contain information relevant to the market order and also the protocol utilized by the downstream liquidity venue.

III. The Trailer. The trailer is also known as the footer. The trailer typically contains information that informs the recipient that the end of the data packet has been reached and also potentially contains information pertaining to error checking, such as a cyclic redundancy check (CRC) (e.g., a hexadecimal payload aggregation check).

When a data packet is received by a host, the first information within the data packet to be examined would be information pertaining to the Network Stack protocols, e.g., information pertaining to the Ethernet, IP, and TCP protocols within the header. This can be seen in FIG. 3, which depicts an example data packet 300 containing a market order from an ATS using the Arrowhead protocol. It can be seen that the first three portions of the data packet 300 pertain to the Ethernet, IP, and TCP protocols.

The PS system can be programmed to then examine information pertaining to the order itself within the "payload" of the data packet. The payload could contain information about the protocol used by the liquidity venue, such as The Financial Information Exchange Protocol (FIX) or other industry standard protocols such as the Tokyo Stock Exchange Arrowhead Protocol, etc. In the example shown in FIG. 3, the Tokyo Stock Exchange Arrowhead Protocol is identified. The payload can also contain detail of the content of the order, and include information such price, amount, direction (buy or sell), instrument ID, market ID, order type/time in Force, order ID & market participant ID.

Finally, the PS system can read any information in the trailer/footer. As described above, in certain embodiment, the trailer or footer can include information to confirm all the elements of the received data packet. For example, the data packet of FIG. 3 includes a "checksum" to verify all the elements in the data packet.

As the PS system examines a market order, it will generally do so in the chronological sequence in which the order was sent (and as per the OSI Model). In other words, it will read the packet control data first containing the Ethernet, IP and TCP data, and then the payload information containing details on the order, including the use of the protocol demanded by the liquidity venue (e.g., FIX, OUCH, Arrowhead, etc.). The protocol of the exchange venue can have a large impact upon the latency of reading the order within the data packet because the complexity of the protocols can vary significantly. For example, the OUCH protocol used by NASDAQ and adopted by many other exchanges is a binary protocol that is typically 15 Bytes in size when used to detail the exchange order. However, protocols such as Arrowhead as used by the Tokyo Stock Exchange can be quite verbose in detailing an exchange order and can be up to 75 Bytes in size. This results in the payload of a data packet being much larger and means that the PS system will have to examine additional data prior to and during the order risk checking process, which adds additional latency.

As the PS system reads each portion of the payload within the data packet (containing the elements making up the whole order), it will then check the validity of each order heading value against a pre-programmed risk value, e.g., Price, Amount, Direction, etc. In the example of a market order containing an erroneous order price of $500 per share when the current price is $50 per share, the PS system will see an order price of $500 per share and will realize it should be rejected for a price threshold breach. Noting that the whole order should not be sent to the liquidity venue containing all its current values, the packet sniffer requires a method of preventing the order from being accepted as valid by the liquidity venue.

Rather like watching a train passing by (with the elements of data that make up the order residing in each "carriage"), the packet sniffer is aware that it may already have potentially let a number of carriages containing permissible data to pass by when it now views a carriage containing the offending $500 per share price data. Given that it is impossible to "call back" the carriages containing real-time data packet elements of the offending order that have already been inspected and passed by the pre-trade risk function in real-time, current Symbol Substitution PS systems generally must buffer all trade orders that they receive. This is a result of their method of preventing execution of the invalid risk checked order. As previously detailed, a Symbol Substitution PS system prevents the execution of the invalid order by substituting the (intended) tradable symbol with that of a test symbol. However, given that the Symbol field of an order will be inspected within the payload ahead of the Price field, the PS system has to buffer the entire order in case it is required to perform a symbol substitution as a result of pre-trade risk breach. In other words, it needs to hold up the entire "train" in case it has to go back and swap the symbol identifier in one of the earlier carriages. Consequently, the buffering of the order adds latency to the entire risk checking process of a Symbol Substitution PS system. It is this additional buffering process that therefore makes Symbol Substitution PS systems slower than Order Corruption PS systems.

Figure 4A:
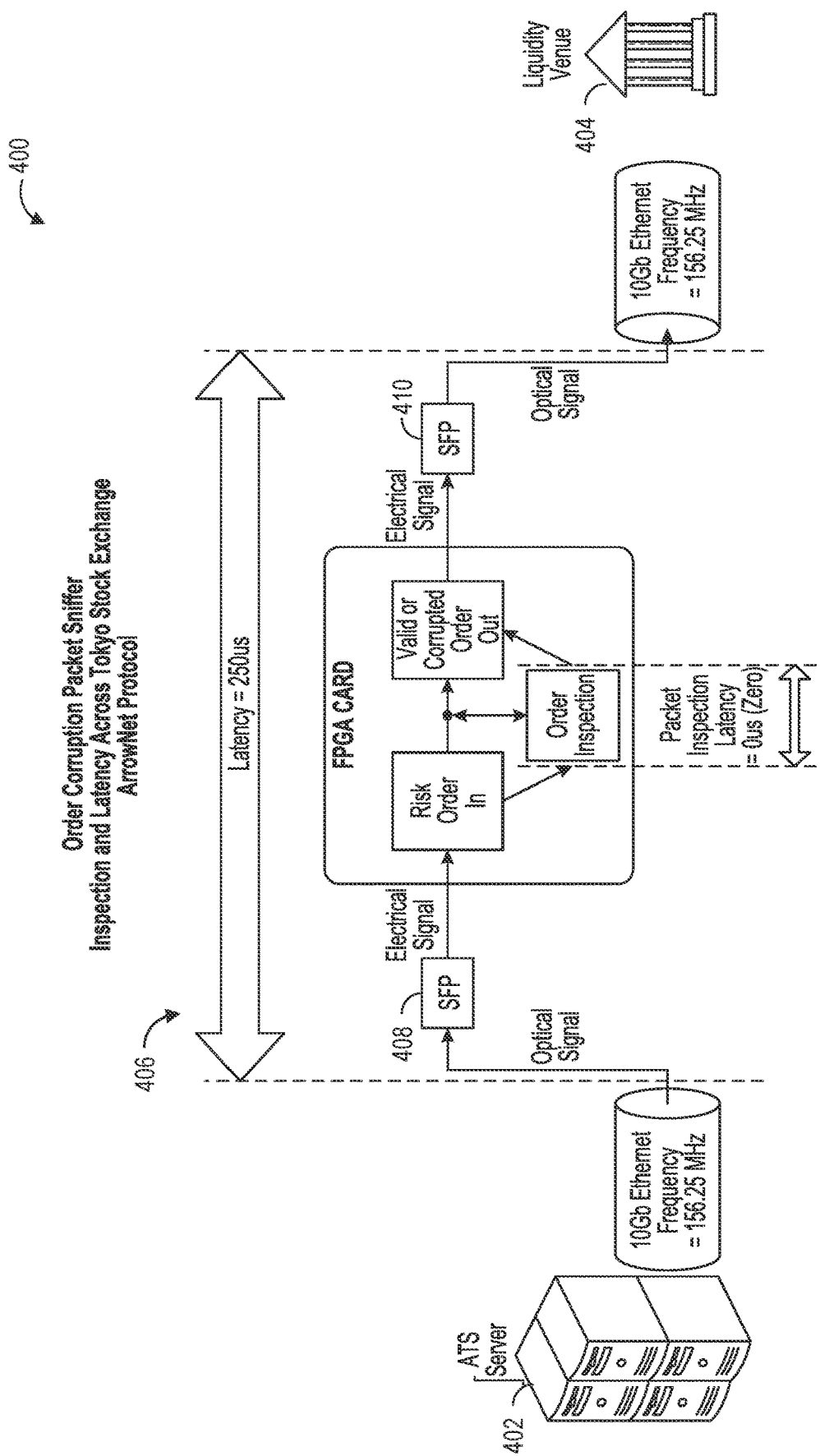
FIG. 4A illustrates an example scenario associated with an order corruption packet sniffer pre-trade risk check system.
Figure 4B:
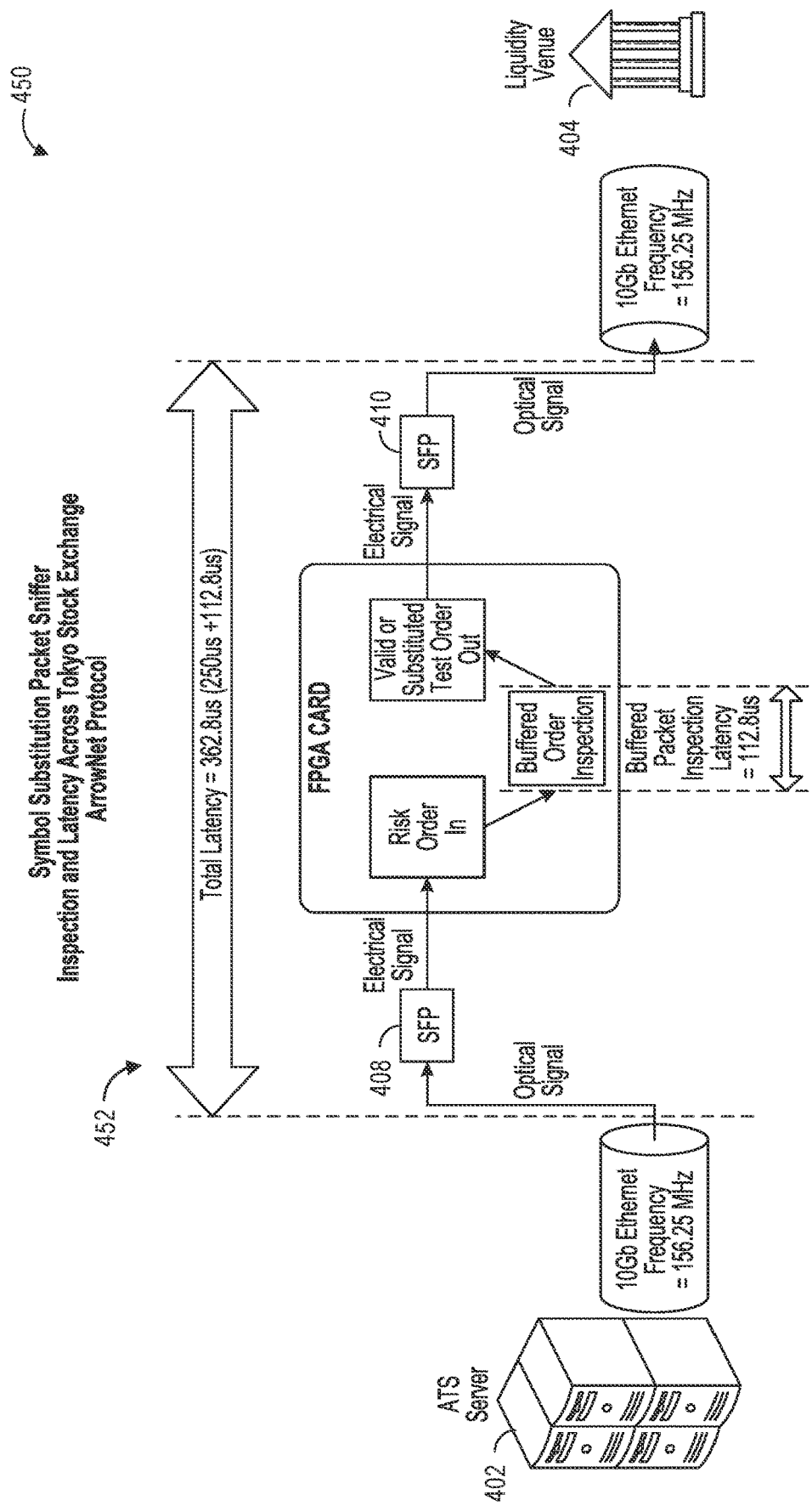
FIG. 4B illustrates an example scenario associated with a symbol substitution packet sniffer pre-trade risk check system.

FIGS. 4A and 4B depict the latency differences between a typical Symbol Substitution PS system and an Order Corruption PS system. FIG. 4A depicts an example scenario 400 in which an order from an ATS server 402 to a liquidity venue 404 is inspected by an Order Corruption Packet Sniffer system 406. The Order Corruption PS system 406 converts an optical signal from the Ethernet to an electrical signal via an optical transceiver module 408 for analysis by the PS system and then back to an optical signal via an optical transceiver module 410 for onward transit to the liquidity venue 404. FIG. 4B depicts an example scenario 450 with similar components, but with a Symbol Substitution PS system 452 instead of the Order Corruption PS system. As will be described in greater detail herein, the Order Corruption PS system 406 introduces no additional latency, because there is no buffering required. However, the Symbol Substitution PS system 452 introduces latency in order to buffer the order during inspection. In FIG. 4B, this latency is depicted as approximately 112.8 us.

To prevent the risk of an invalid order from being executed, the Symbol Substitution PS system upon viewing an order containing an element outside of the agreed risk tolerances is programmed to automatically replace the intended order symbol with a test symbol. The data packet containing the test symbol is converted from an electrical signal back to an optical signal and then passed onto the optical Ethernet link for delivery to the market venue. In substituting the order symbol, the PS system ensures that the Market Venue will receive a test order containing the order share price of $500 per share, rather than an order that will be executed. This ensures that the client does not trade beyond their risk parameters as pre-programmed into the PS system.

Current Order Corruption PS System Risk Check Example

Order Corruption PS systems operate in precisely the same manner as previously detailed with regard to Symbol Substitution PS system, until the point at which they need to need to inspect an order for its risk limits. As stated, the main difference is that the order corruption system corrupts the order so that it is rejected by the liquidity venue. This method does not require that the order is buffered because the "carriages" containing the order elements are inspected in transit, hence, why it is faster than the Symbol Substitution method.

The risk rejection is achieved because as the order is inspected in transit, the last element (e.g., the last train carriage normally containing the packet Check Sum) is corrupted to prevent order acceptance by the liquidity venue. However despite being the faster of the two current methods of PS system order inspection, this solution does have negative aspects.

As discussed above, the action of sending a corrupted message to a liquidity venue in order to prevent the entry of an erroneous order is not without its own consequences. This is because upon receipt of a corrupted message, the market venue will automatically disconnect the user's trading session in order to preserve the integrity of the trading venue itself. This in turn can result in two potential outcomes:

a) The broker/client is disconnected from the venue and is left unable to interact with any other valid orders that they might have submitted to the venue and they are left equally unable to send any further orders until the session connection is re-established.

b) The broker/client experiences what is known as a "cancel on disconnect" scenario whereby the trading venue will automatically cancel all orders previously sent by that trading session (even if they are valid within the order book). The broker client will equally be unable to send any further orders until the session is re-established.

In both scenarios, the broker/client is left without a live trading session and is either unable to access their existing orders or will have their entire order book cancelled by the market venue. Furthermore, by sending a deliberately corrupted message to the market venue, the Broker/client are by their very activity not acting in a manner which should be encouraged and are not performing a graceful interaction with either the liquidity venue nor the trading client (ATS) that sent the erroneous order. Moreover, Order Corruption PS systems are relying on the trading venue to react to their deliberately corrupted message in order to prevent a potentially catastrophic event occurring within a market venue. Specifically, the broker/client is knowingly sending an order to a market venue without any intention of having the order executed. Therefore, they are relying entirely on the order inspection method of the liquidity venue to reject their order. This method therefore assumes that check sum calculation of the liquidity venue is operating correctly. If the check sum calculation is not operating correctly, there is a risk that the invalid order could potentially reach the liquidity order book and be executed. In essence, the operator of the Order Corruption PS system is passing entire responsibility for pre-trade risk rejections to the liquidity venue.

Consequently, a new method of order inspection that is able to achieve the speed of pre-trade risk analysis as found in current Order Corruption PS systems but via a safer and more graceful interaction with the liquidity venue would be desirable.

Current Symbol Substitution PS System Latency Issues

The presently disclosed systems and methods are designed around an understanding of how and where latency is added to the current order inspection methods of PS systems, including knowledge of the underlying protocols making up the network stack and also how these protocols format and send an order for receipt by the liquidity venue. They are also based upon a further detailed understanding of how the protocols making up the network stack (e.g., Ethernet, IP and TCP) are utilized and also for what specific purpose. Consequently, the latency inherent within current PS systems has been identified as being the result of two main weaknesses within the current inspection methodology.

First, current PS systems must read orders across a number of industry standard liquidity venue protocols, such as OUCH, Arrowhead, FIX etc., which can vary immensely in their complexity and subsequent ease of analysis. As a consequence of their varied complexity, these industry protocols add an inconsistent latency overhead to the PS systems examining the order data described within them. Accordingly, a system and method that was able to standardize these protocols and therefore reduce these latency differentials would be desirable.

Figure 3:
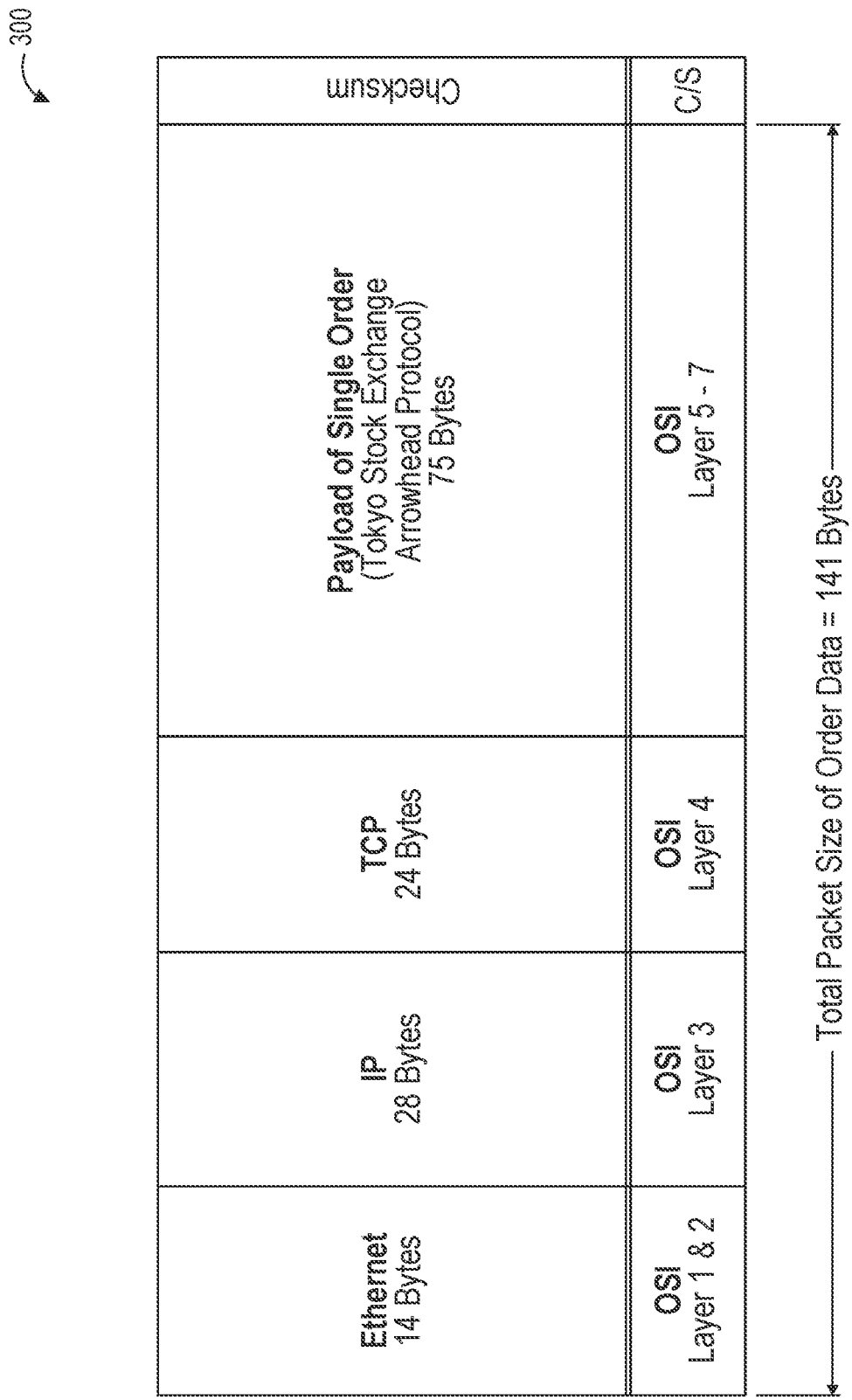
FIG. 3 illustrates an example market order data packet structure.

Second, due to the standard methodologies used in computing, especially concerning the formation of data and its transport across a network link, the ability to inspect order flows is often compromised due to the latency overhead of utilizing different protocols inherent within the network stack (which enable the transmission of data between separate hosts, e.g., between the ATS and the PS system providing pre-trade risk analysis). As shown in FIG. 3, the Ethernet, IP and TCP protocols add 66 Bytes to the order packet size. Moreover, because these protocols exist across the layers 1-4 in the OSI model, it means that these have to be analyzed by the PS system prior to the PS system inspecting the actual order information held within layers 5-7 of the OSI model. This mandatory inspection of the network stack protocols adds latency to the whole order inspection process. Unfortunately, because these network stack protocols are critical to the normal operation of computer and network hardware interconnections, the ability to reduce the latency of these protocols systems would appear limited.

Low Latency Symbol Substitution Packet Sniffer Systems and Methods

When analyzing the concepts behind the network stack protocols and also the underlying design principles, it appears that the protocols have been designed to operate on networks where there are potentially a large number of users. Further, when the protocols are examined together, it is apparent that the key issue that they are designed to address is the delivery of information between precisely targeted senders and recipients, especially in networks where there are a large number of connected network devices that need to be differentiated. However, when a network consists of only a few devices (e.g., an ATS and a PS system), the need to utilize the full range of target addressing functions inherent within the network stack protocols becomes reduced. This is because the requirement to use the protocols to differentiate between multiple network adaptors existing on a LAN no longer exists.

For example, at the simplest level, the combined use of Ethernet, IP, and TCP protocols enables a host to identify and communicate with other hosts upon a network. An analogy can be made that explains their usage in terms of a UPS postal address on a standard letter, whereby the IP protocol can be likened to the recipient's address, the Ethernet protocol is the recipient's ZIP code, and the TCP protocol is the method of letter delivery. Accordingly, in an environment where there is only one person writing and sending letters and only one possible recipient, the requirement for utilizing a comprehensive and industry standardized addressing system to specifically differentiate from other possible recipients is made redundant. A letter could merely have the recipient's name as an identifier and could forego the need for an address or ZIP code for use by the postal service (assuming that they already knew the location of the intended recipient and that there was only 1 address on their postal route).

Consequently, given that the network stack protocols could exist in a closed network consisting of only the ATS and the PS system, the level of protocol addressing required for each system to identify each other could be reduced. This reduction in the level of required address identification between the respective systems therefore means that the protocols themselves would not be compelled to deliver the same amount of address information because the need to differentiate from other recipients would be removed. Moreover, it would also mean that certain address identifying elements within the three protocols would now be redundant and accordingly could be used for other purposes such as for identifying and detailing elements of the underlying order held within the payload of the data packet. Utilizing elements of the network stack protocols to identify order data would be desirable from a latency perspective because (as per the OSI model), it would mean they would be received and analyzed by the PS system in layers 1-4 of the OSI model and ahead of the normal payload order data which currently exists in OSI layers 5-7.

Therefore, the currently disclosed Symbol Substitution PS systems and methods can manipulate the network stack so that a sender of an order message (e.g., the ATS) is able to detail elements of its order within these protocol layers. In detailing this new utilization of the network stack protocols, two slightly different exemplary configurations are described within this disclosure, and labeled Approach 1 and Approach 2. The first approach is not as complex as the second and accordingly may not offer the same latency reduction due to its more simplified approach. However, both approaches do offer significant latency benefits over existing methods and this is because they both share elements of the overall design approach.

Figure 5A:
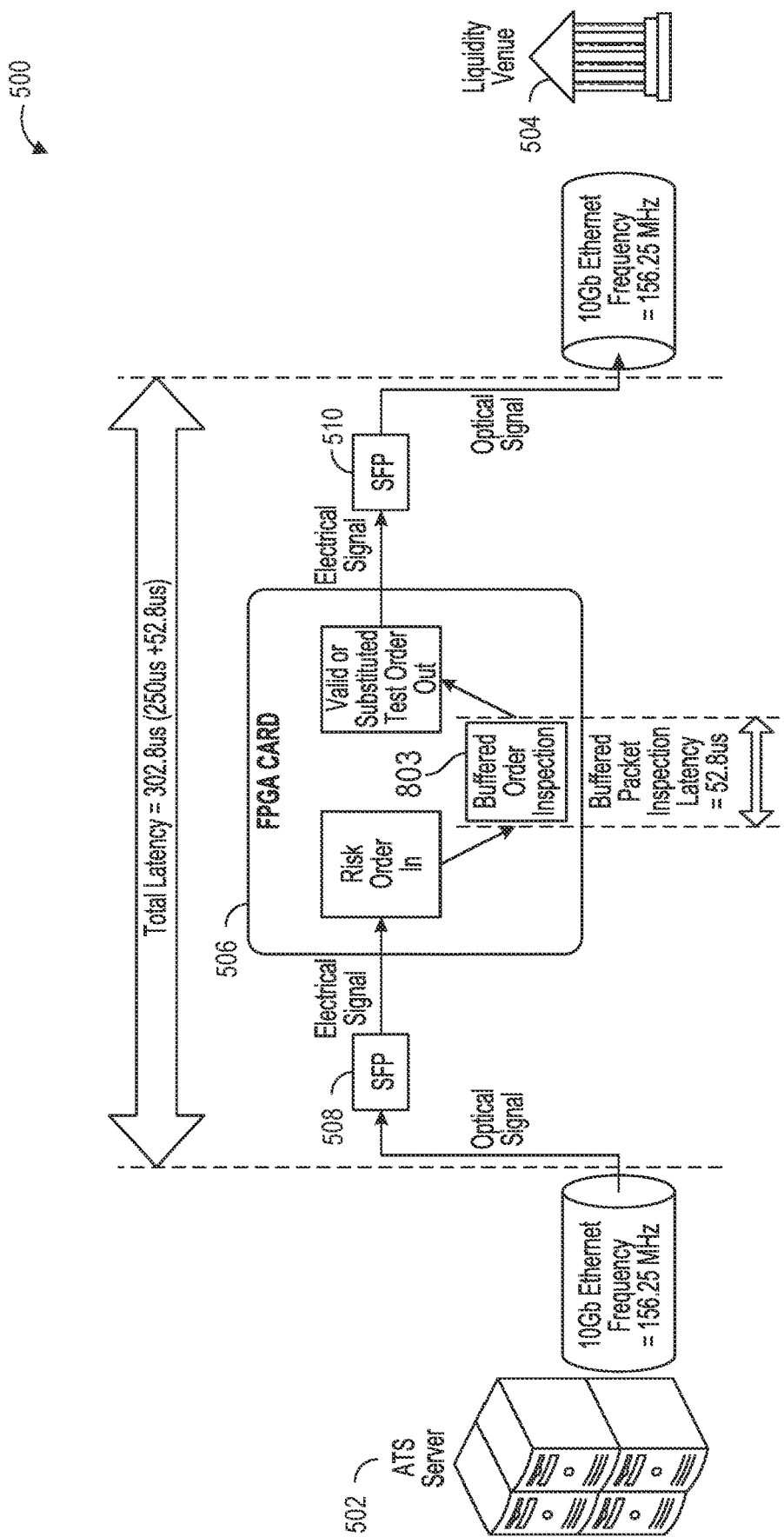
FIGS. 5A and 5B illustrate example scenarios associated with improved symbol substitution packet sniffer pre-trade risk check systems, according to one or more embodiments of the present disclosure.
Figure 5B:
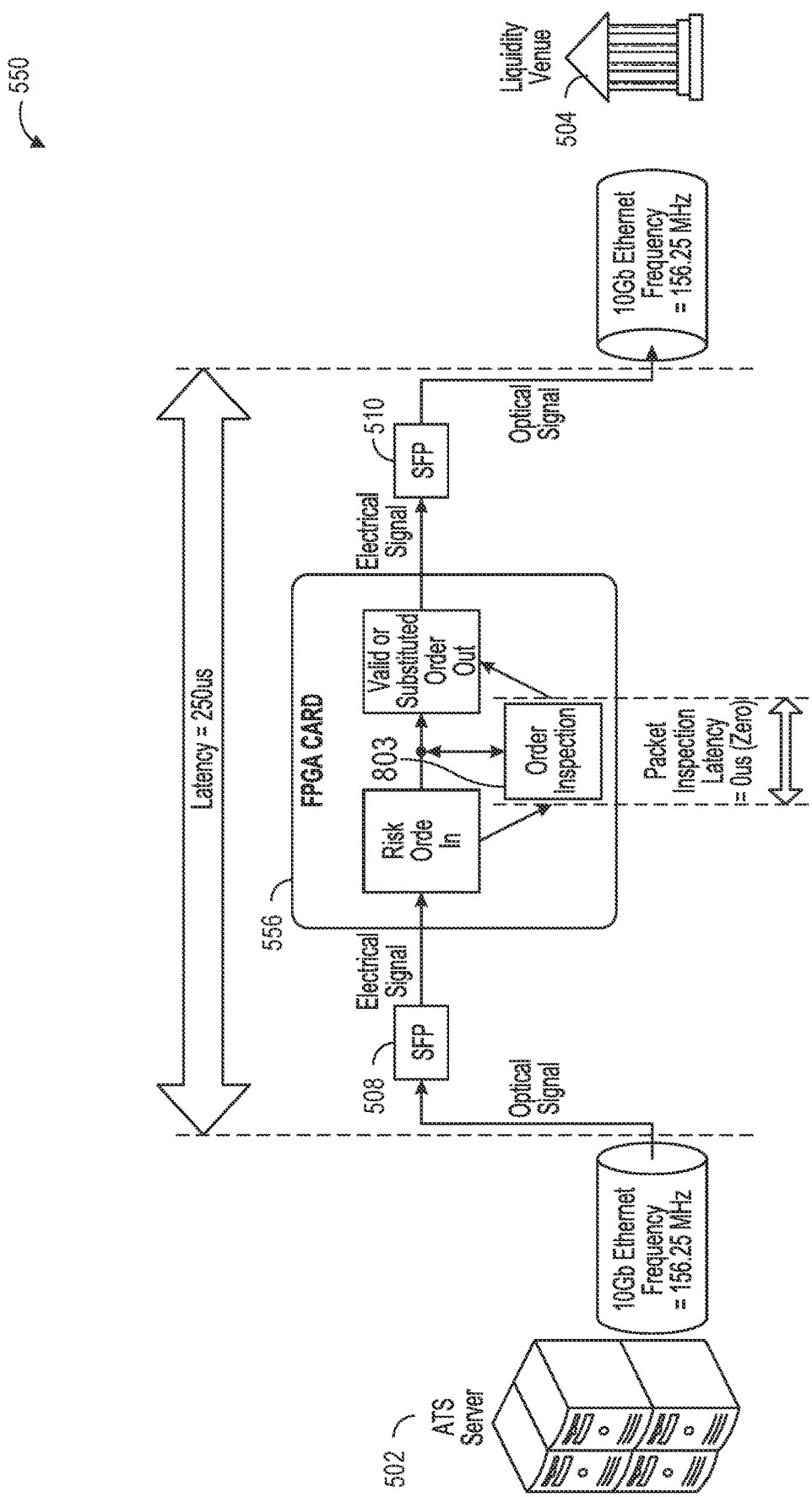

FIGS. 5A and 5B depict exemplary embodiments of new low latency symbol substitution packet sniffer systems 500 and 550, respectively, according to various embodiments of the present disclosure. FIG. 5A shows a first embodiment of the symbol substitution packet sniffer system 500 in which the order is buffered to allow the payload of the order to be analyzed (Approach 1, described in greater detail below). FIG. 5B shows a second embodiment of the symbol substitution packet sniffer system 550 in which the order is not buffered since the pre-trade risk assessment can be completed without analyzing the payload of the order (Approach 2, described in greater detail below). Each figure shows a symbol substitution packet sniffer system (500, 550) that has a packet sniffer component (506, 556) that receives each order, assesses the pre-trade risk of each order, and either sends the order to a liquidity venue 504 with a substituted test symbol if the order exceeds the pre-trade risk parameters for the particular symbol, or sends the original order to the liquidity venue 504 if the order does not exceed the pre-trade risk parameters for the particular symbol. The packet sniffer components (506, 556) may include a processing component and a memory component that stores a plurality of lines of computer code to control the processing element. In one embodiment, the packet sniffer components (506, 556) may be implemented using a field programmable gate array (FPGA) card. The symbol substitution packet sniffer systems 500, 550 also utilize SFP component 508 that converts the incoming optical signals containing the order into electrical signals that may be processed by the packet sniffer components 506, 556. The symbol substitution packet sniffer systems 500, 550 also utilize SFP component 510 which converts the order of the substituted symbol order from the packet sniffer component 506, 556 into an optical signal to be sent to the liquidity venue 504.

The two exemplary approaches depicted in FIGS. 5A and 5B will now be described in greater detail.

Approach 1

In Approach 1, the design approach is based upon an understanding of where most of the latency is added within current order inspection processes, which is from identifying the symbol within the payload. Accordingly, Approach 1 aims to assist the PS system in identifying the symbol more efficiently by inserting the symbol identifier within the header of the data packet (e.g., in Layers 1-4 of the OSI model) as generated by the ATS. This results in the PS system being able to identify the symbol in advance of the normal payload because, under the OSI model, it will be inspected ahead of its normal data packet location. Under this approach, once the PS system is able to identify the symbol ahead of its normal inspection cycle, it also enables the PS system to then look up the risk parameters associated with that symbol. Consequently, the entire order inspection latency is reduced even though the PS system would still be required to analyze certain parts of the payload (e.g., price, amount, direction, etc.). An example of the format of the data packet using the Approach 1 methodology is illustrated in FIG. 6. As can be seen in FIG. 6, the symbol identifier is moved into Layer 1 so that the PS system can access the symbol identifier earlier in the inspection process.

Figure 7:
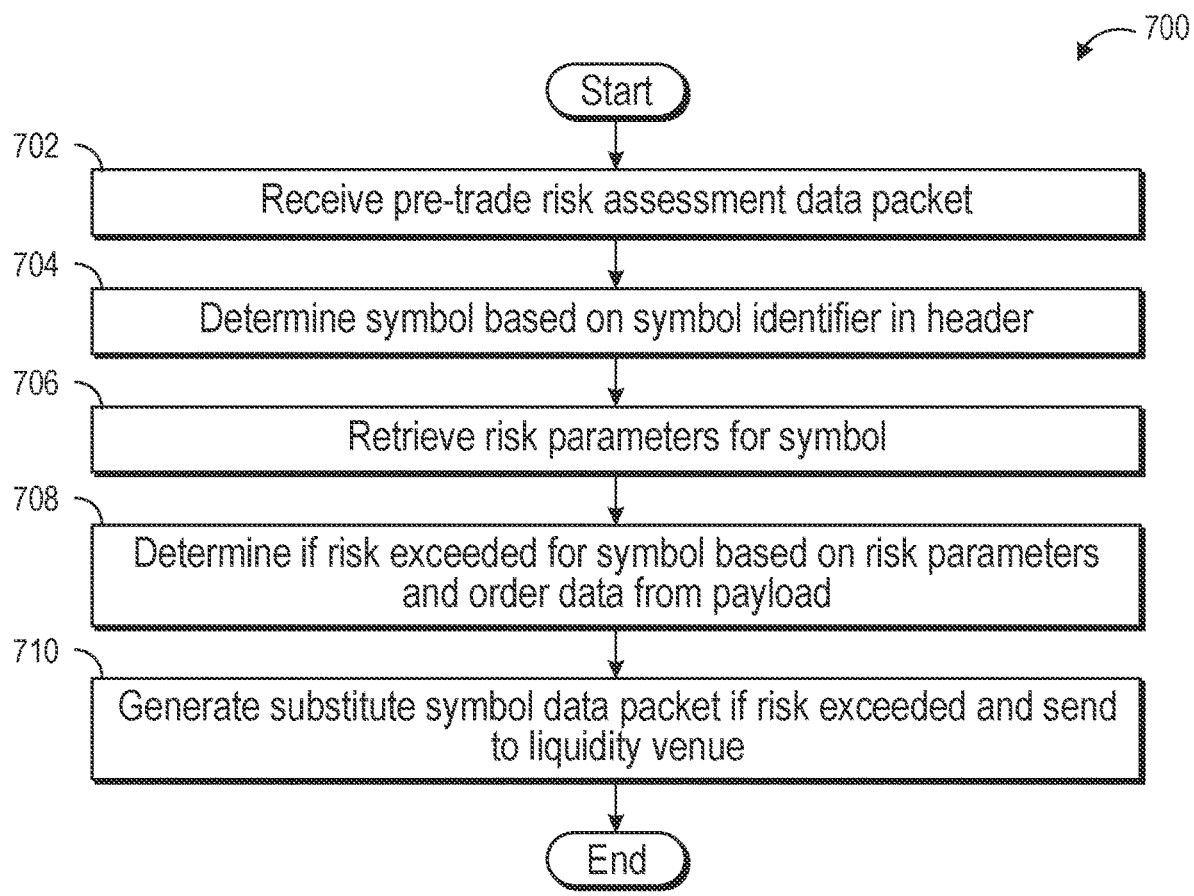
FIG. 7 illustrates an example method associated with performing a pre-trade market order risk check, in accordance with an embodiment of the present disclosure.

FIG. 7 provides a flow chart of a pre-trade risk assessment method 700 according to an embodiment of the present disclosure. At block 702, the example method can receive a pre-trade risk assessment data packet. At block 704, the example method can determine a symbol based on a symbol identifier in a header of the pre-trade risk assessment data packet. At block 706, the example method can retrieve risk parameters for the symbol. At block 708, the example method can determine if a risk is exceeded for the symbol based on risk parameters and order data from a payload of the pre-trade risk assessment data packet. At block 710, the example method can generate a substitute symbol data packet if the risk is exceeded and send the substitute symbol data packet to a liquidity venue.

Approach 2

Approach 2 also utilizes the concept of placing the symbol identifier within the header of the data packet. However, Approach 2 also seeks to place other elements pertaining to the order and its sender within the header space of the data packet of the order. FIG. 8 presents an example data packet as it might be constructed under Approach 2.

This second approach is primarily based upon a knowledge that whilst an order is typically made up of at least 8 separate fields (e.g., Price, Amount, Direction (buy or sell), Instrument ID (Symbol), Market ID, Order type/Time in Force, Order ID & Market Participant ID), the reality is that only four of these fields are required to initially identify an erroneous order: Instrument ID (Symbol), Price, Amount, and Direction (Buy or Sell). Consequently, order values relating to these four fields can be inserted within the protocols of the network stack (for example Layer 1 and Layer 4 as shown in FIG. 8). The PS system would then be able to inspect the order for pre-trade risk assessment ahead of having to inspect the payload as would normally occur in existing PS methodologies.

This second approach also recognizes that operators of an ATS can use a variety of trading accounts within a single system and, accordingly, this second approach provides a way to identify sub-accounts within the header section of the data packet. When combined with order field information within the header, this can have significant latency benefits. Firstly, because the order can be inspected ahead of analyzing the payload information, but also because the inspection of the order would not require any translation of the underlying liquidity venue protocol. This would mean that because the order would always be inspected within the network stack protocols, the latency impact of the liquidity venue protocols would be negated and consistent inspection latency could be observed across all venues.

Figure 9:
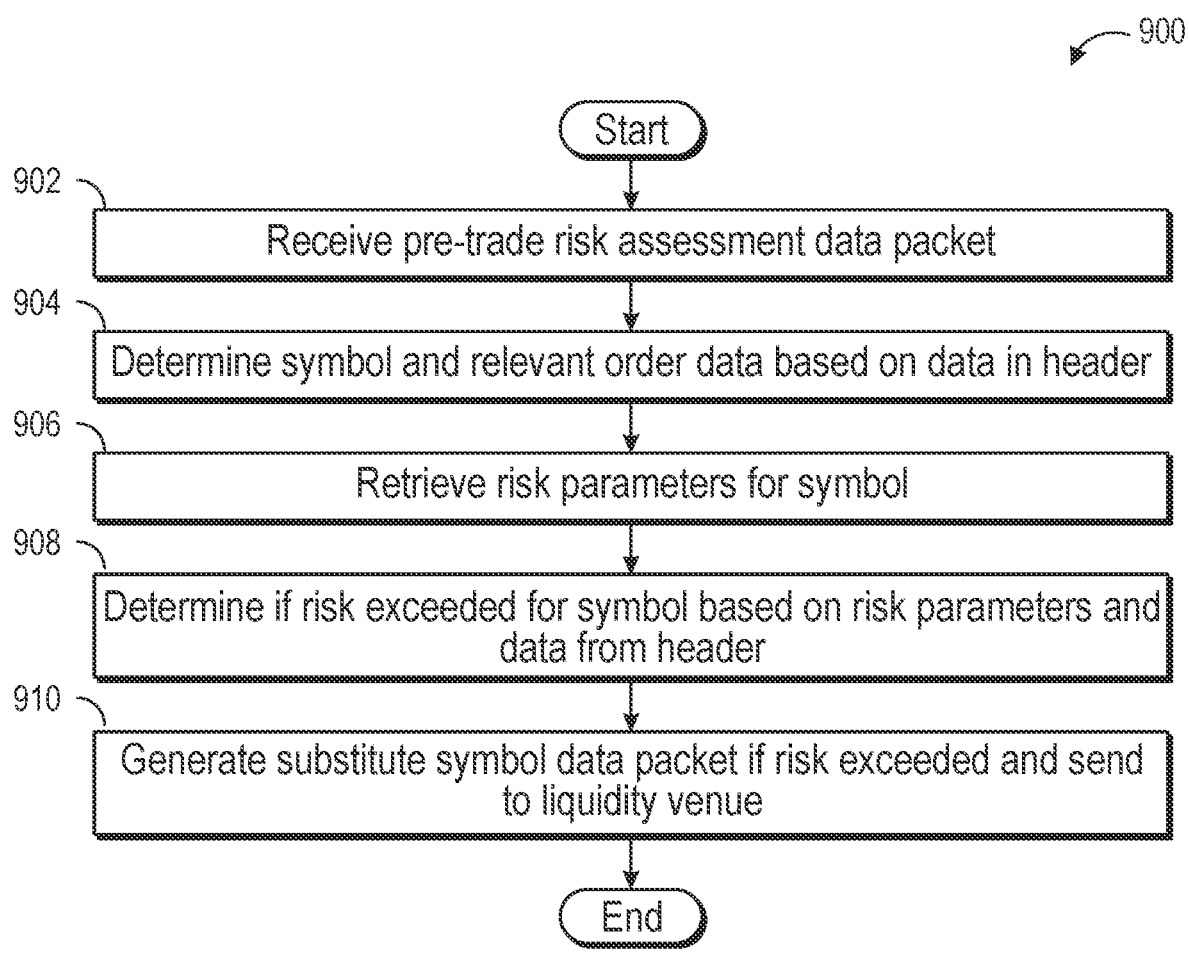
FIG. 9 illustrates an example method associated with performing a pre-trade market order risk check, in accordance with an embodiment of the present disclosure.

FIG. 9 provides a flow chart of a pre-trade risk assessment method 900 according to an embodiment of the present disclosure. At block 902, the example method can receive a pre-trade risk assessment data packet. At block 904, the example method can determine a symbol and other relevant order data based on data contained in a header of the pre-trade risk assessment data packet. At block 906, the example method can retrieve risk parameters for the symbol. At block 908, the example method can determine if a risk is exceeded for the symbol based on risk parameters and the relevant order data from the header of the pre-trade risk assessment data packet. At block 910, the example method can generate a substitute symbol data packet if the risk is exceeded and send the substitute symbol data packet to a liquidity venue.

Network Stack Changes

Both approaches therefore rely upon a number of subtle changes being made to the configuration and operation of the network stack protocols encompassing ARP, Ethernet, IP, and TCP. In addition, in certain embodiments, the new approaches would also employ a new method of communication that would mean that the PS system would be the targeted recipient for the new or amended order data packets rather than the downstream trading venue. In other words, the orders would be sent specifically to the PS system for inspection rather than the PS system merely inspecting them in transit to the trading venue as occurs in current systems. The changes to the network stack protocols will now be discussed in greater detail.

ARP Changes

As stated previously, the normal purpose of ARP is to send out a network broadcast request to resolve fixed MAC addresses of computer hardware/network adaptors and their assigned IP addresses as is typical of a network installation. Typically, the MAC address is usually set as a tightly controlled 12 character Alpha-Numeric unique factory-defined fixed value. Once resolved, the MAC address is listed in the host's ARP table for future reference and now forms the first part of any TCP/IP traffic transmitted between the respective hardware systems (e.g., in this case the ATS and the liquidity venue network device). An example scenario would be as follows:

A host (with an IP address of 10.0.0.1 and MAC Address of 00.00.00.00.00.01) is instructed to connect to the IP Address 10.0.0.2. However, the host with IP Address 10.0.0.1 has no knowledge of the MAC address of 10.0.0.2 and therefore, before any network transmission can commence, it must first send an ARP request to resolve the MAC address of 10.0.0.2. The MAC address of 10.0.0.2 can be any unique factory-defined value apart from FF.FF.FF.FF.FF.FF as this is a broadcast MAC address and is reserved. In normal circumstances (e.g., in a standard open LAN configuration), the host with IP Address 10.0.0.2 will respond with its factory pre-set 12 character MAC address (xx.xx.xx.xx.xx.xx).

However, for private networks, MAC addresses can be set to any value desired because there is no requirement to rely upon the MAC address assigned by the hardware manufacturer to differentiate between multitudes of separate hosts residing upon the LAN. For example, in this example scenario, there are only 2 hosts that need to communicate at a network level (the ATS and the PS system), and through careful assignment of manual MAC addresses, the chance of a duplicate MAC address being assigned can be eliminated. It is this capability that this new system and method seeks to exploit by linking the IP addresses (and the subsequent MAC address returned during the ARP process) to tradable instruments on a liquidity venue.

Tradable Instruments

In normal practice, the instruments available to trade on a liquidity venue ("tradable instruments") are published by the venue in what is commonly known as the Start of Day (SOD) file, which is made available to all connected participants prior to each daily market open. The SOD file is normally downloaded by a participant into their trading system (ATS) and forms the basis of what the participant is allowed to trade upon that venue. The file typically contains a list of unique symbols that relate to each instrument and which are truncated for ease of use. For example, Microsoft would be listed as symbol MSFT (on NASDAQ). The symbols are used as unique identifiers when an ATS wishes to send an order to a liquidity venue and would typically appear in the payload of the data packet containing the order.

Figure 10:
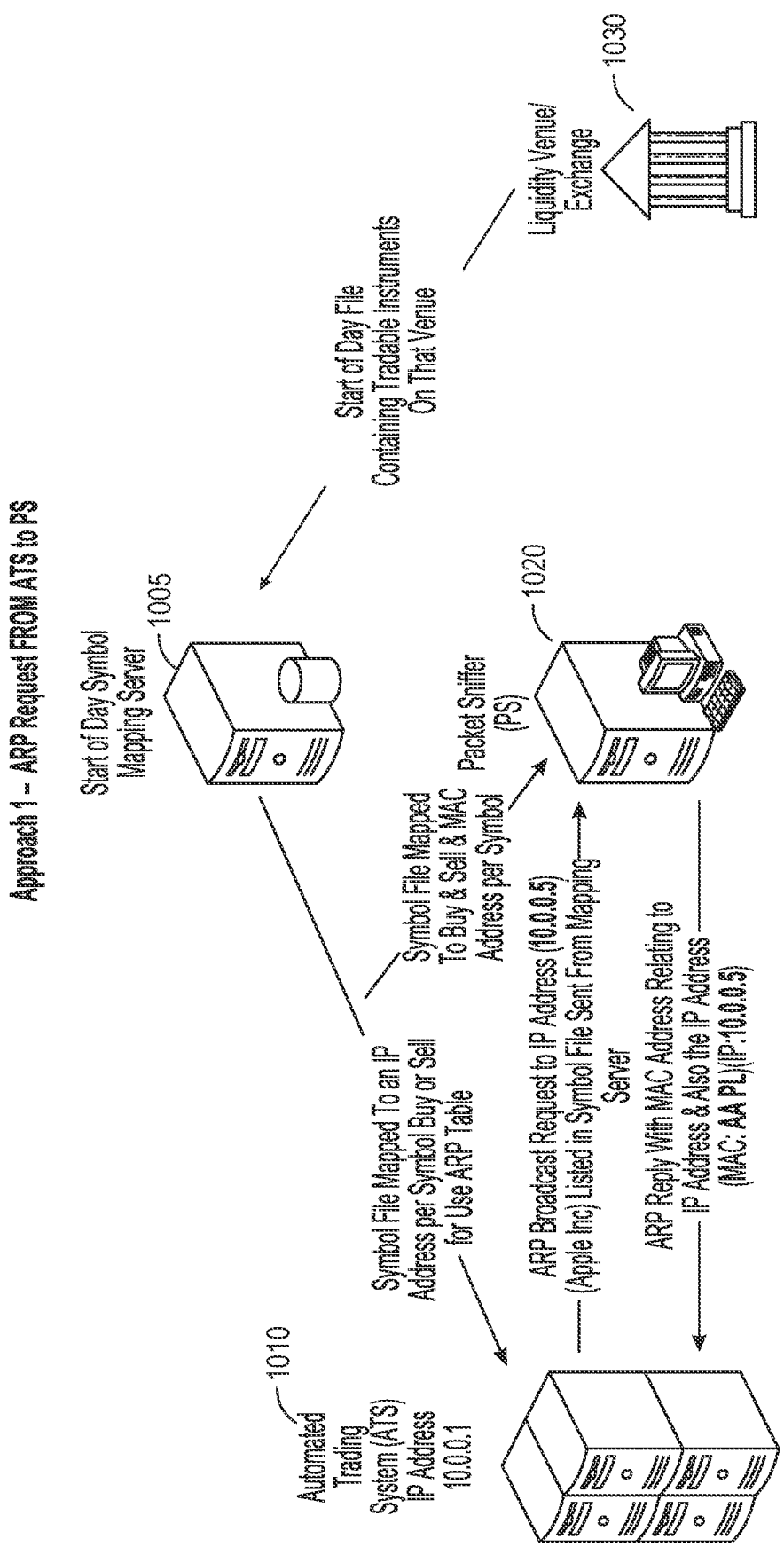
FIG. 10 illustrates an example pre-trade risk check system, in accordance with an embodiment of the present disclosure.
Figure 11:
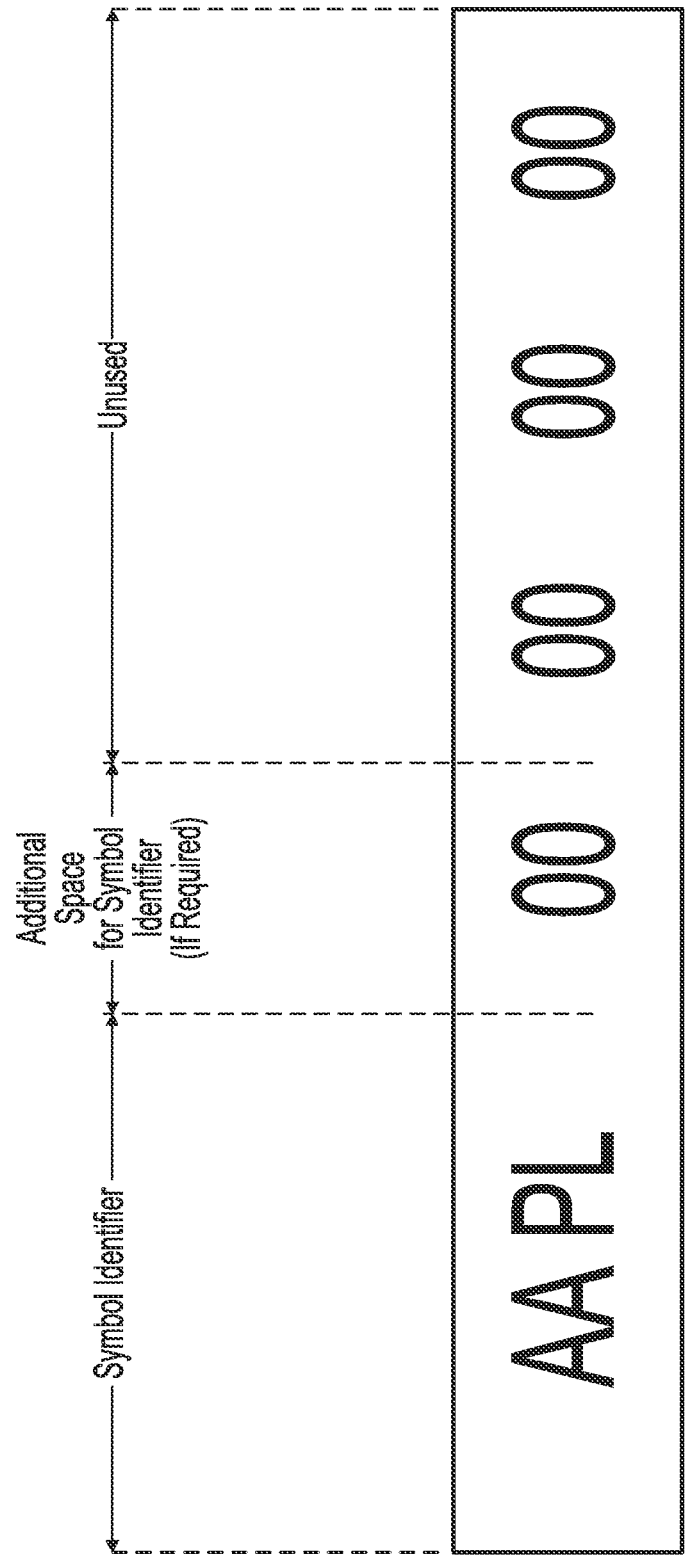
FIG. 11 illustrates an example assigned MAC address, in accordance with an embodiment of the present disclosure.

However, under Approach 1 introduced above, the SOD file would be downloaded by a central server 1005 (as shown in FIG. 10), which would include a database, including a conversion table, containing all the symbols available within the liquidity venue. These symbols could be aligned in the conversion table with two further columns containing a unique private IP address and also a unique private MAC address for each symbol. An example conversion table for Approach 1 is shown in FIG. 14. The configuration of the MAC address under Approach 1 can be seen in FIG. 11, which details how each MAC address can be constructed per tradable symbol item according to an embodiment of the present disclosure.

Under Approach 2, the central server 1205 (as shown FIG. 12) can again align the symbols to a unique IP address and a unique MAC address. However, the MAC address would be configured to allow assignment of a unique client account number, and also a "buy" or "sell" indicator, as shown in an example conversion table shown in FIG. 15. As can be seen in FIG. 15, the central server 1205 in Approach 2 can be configured to record two instances of each symbol which would enable the recording of a buy or sell indicator against each downloaded symbol. An example configuration of the MAC address under Approach 2 can be seen in FIG. 13. The differences in format of the two conversion tables for Approach 1 and Approach 2 can be seen in FIGS. 14 and 15, which detail how this information could be recorded for downstream use in the two approaches, respectively.

Within both conversion tables (as shown in FIGS. 14 and 15) there are common elements, some of which are detailed below:

Stock Name (as provided by Exchange within the SOD File)

Stock Symbol (as provided by Exchange within the SOD File)

Unique Private Network IP Address (as assigned by central server 1005, 1205)

Unique Private Network MAC Address (as assigned by central server 1005, 1205)

Within both Approaches 1 & 2, as shown in FIGS. 10 and 12, respectively, after the IP and MAC addresses have been assigned, conversion table files can be sent from the central server 1005, 1205 in two separate versions to both an ATS 1010, 1210 and also to a PS system 1020, 1220 analyzing the orders for pre-trade risk. The file sent to the ATS 1010, 1210 would contain the Stock Name, Exchange Symbol and the newly assigned private network IP Address for each symbol, whilst the PS system 1020, 1220 would be sent a file containing the Stock Name, Symbol, the private IP Address and also the newly assigned private MAC address for each symbol. In both of the proposed approaches, the use of the conversion table files would enable alignment between the ATS 1010, 1210 and the PS 1020, 1220 concerning each listed symbol. Furthermore, and perhaps more importantly, this would allow symbol identification to occur within the IP and MAC addresses. In the Approach 2 configuration, the use of the conversion table files would also allow for the order direction (Buy/Sell) to be identified within the MAC address and also any sub-account trading identification as may be required. The method and detail concerning Symbol, Direction and Sub Account Identification for Approach 2 can be seen in FIG. 13.

Operation and Conversion Table Files

As stated previously, for a network connection to be established between two hosts on a LAN, the initializing host needs to resolve the IP Address and the MAC address of the intended recipient. This is achieved through an initial use of the ARP protocol. In normal operation, each host would have a single IP address and a single MAC address as assigned by the hardware manufacturer.

However, under the systems and methods disclosed herein, the ATS can be assigned a single IP address and MAC address to communicate with the PS system (e.g., 10.0.0.1) but the PS system, when communicating with the ATS, could operate using the IP addresses and associated MAC addresses as assigned within the conversion table file (and which are subsequently linked to a tradable symbol). Therefore, when communicating a new or amended order to the PS system, the ATS would be using the range of IP addresses covering all the symbols within the conversion table file that it will have been sent prior to market open.

In Approach 1 (as shown in FIGS. 10 and 14), should the ATS 1010 wish to send a new order on a symbol it has not previously traded on that day, it can look up the Stock Name/Venue Symbol as per FIG. 14 and then utilize the corresponding IP address to communicate the order. For example, should the ATS 1010 wish to trade Apple shares, it will look up the Apple Symbol and, as per FIG. 14 (and then as per FIG. 10), it will send an ARP request for IP address 10.0.0.5. In reply, the PS system 1020 will respond with the assigned MAC address of AAPL, which would then be used by the ATS 1010 to update its ARP cache and then used to send this order and all subsequent orders for this symbol/stock.

In Approach 2 (as shown in FIGS. 12 and 15), should the ATS 1210 wish to send a new order on a symbol it has not previously traded on that day, it will again need to look up the Stock Name/Venue Symbol. However, as shown in FIG.

15, the ATS will also be required to use the IP address corresponding to whether the new order instruction for this symbol is a buy or sell. For example, should the ATS 1210 wish to buy Apple shares, it will look up the Apple Symbol and as per FIG. 15, it will then look up the corresponding IP address for a buy order, i.e., 10.0.0.6. As per FIG. 12, it will send an ARP request for IP address 10.0.0.6 and in reply, the PS system 1220 will respond with the assigned MAC address of AA PL 33 02, which would then be used by the ATS 1210 to update its ARP table cache and to send this order and all subsequent orders for this symbol/stock.

In FIG. 12, it will be apparent that the MAC address provided by the PS system 1220 in Approach 2 has additional characters beyond the MAC address provided within Approach 1. These additional characters are explained in FIG. 13, which details how the MAC address in Approach 2 is used to identify not just the Symbol but also the 'Sub-Trading Account' (in this example, account number 33) and also the trade direction (in this example, 2 depicts a Buy order and 1 would detail a Sell order). It should be noted however, that for the sub-account information to be sent in the MAC address of the ATS submitting the order, there may be a requirement for the conversion table files to be listed and sent per sub account, per unique IP address, per unique MAC address, and per order direction to both the ATS and the PS system prior to market open. Essentially, there could be separate conversion table files per trading sub-account so that the PS system could know what relative risk values to apply. In other words, when the ARP request is initiated, the PS system may need to see unique IP address ranges per sub account. Through having unique IP address ranges per sub account, the PS system would then be able to respond with the correct MAC address for the corresponding sub-account. The unique IP address would determine both the symbol and the sub-account and the corresponding MAC address held by the would determine both the symbol, the sub-account, and the trade direction to be sent by the PS system within its ARP MAC address reply.

For both approaches, the use of the MAC address allows the ATS to detail the Symbol to the PS system within layers 1 and 2 of the OSI model because the MAC address would be utilized by the Ethernet Protocol. Additionally, for Approach 2, the use of the MAC address also allows order direction (Buy/Sell) and sub-account identification to be sent at the same level of the OSI model. However, for full order inspection of an erroneous order via Approach 2 (e.g., comprising Symbol, Direction, Amount, and Price), there is an additional requirement to identify the Order Price and Order Amount within the network stack protocols. Given that Order Price and Order Amount are variable figures pertaining to each order, it would be impossible to utilize the MAC address to deliver these fields as these are allocated prior to market open. Furthermore, because the MAC address is made up of only 12 usable characters, it would lack the available space to carry Price and Amount details, in addition to the existing order identifiers already assigned as part of the method described. Consequently, an additional method may be used to convey the Order Price and Order Amount data within the network stack protocols for Approach 2.

TCP Protocol Usage within Solution 2

A standard function within the TCP protocol is the ability to identify port addresses when communicating between hosts. However, the port addresses do not represent physical hardware, but, rather, are used to identify a logical service or process. A port is always associated with the IP address of a host (and also the protocol type of the communications) and, in standard configurations, is used to complete the sender or destination address of a network communication session. A port number is thus defined as a 16 bit number used to provide further identification of an IP address and its associated protocol.

In an open network configuration, the TCP port address is primarily used to differentiate from other services or processes that might be undertaken between two hosts. However, in a closed network consisting of an ATS and a PS system, the requirement to utilize these port addresses for ease of communication is negated as there are no other services or processes that need to be differentiated. Accordingly, the use of the TCP port address function becomes redundant and thus becomes available for other potential usage.

Therefore, Approach 2 can utilize the TCP port address identifiers as follows:
TCP Sender Port=Order Amount
TCP Destination Port=Order Price In standard usage, the TCP ports contain only numeric values and are consequently able to identify both of these order elements without any further adoption. For order prices that contain a decimal point, the PS system could be designed to assume a number of decimal points when reading a price within the Destination Port configuration or accordingly the decimal point could be configured as a space within the overall order price detail, e.g., 126444.

Consequently, through use of the TCP port addresses (in combination with the MAC address), Approach 2 is able to transmit from the ATS all the required elements to identify an erroneous order (e.g., Symbol, Direction, Price & Amount) in the Network Stack protocols, thus eliminating the requirement from the PS to inspect the payload for the order details.

New Symbol Substitution PS System Operational Methodology

The improved PS systems described herein, when analyzing traffic on an optical link, would still need to convert the order message from an optical signal to an electrical signal so that the data packet can be analyzed. The PS systems could analyze the network stack protocols not just for their network and packet configurations but also for the order details that they would now contain (be it just the symbol identifier in Approach 1 or the symbol, price, amount and order direction as per Approach 2). Nonetheless, these would be minor code changes within the packet sniffing application contained with the packet sniffer component in FIGS. 5A and 5B and the ability to inspect the order via the system and method can be implemented.

Approach 2 results in the PS system no longer having to buffer the order in transit, as it would now merely read the header protocols to check the order validity. Approach 2 could be configured to provide uniformity as to where to find the fields for order inspection, which would mean that latency would also be consistent. The consistent lower latency would therefore negate the need to buffer the order for inspection in order to give the PS system time to provide a symbol substitution as may be required for an invalid order. However, in addition to the changes within the order inspection methods, packet sniffing systems can also receive adaptations to their current methods of either preventing an order that had breached risk limits from reaching a venue or allowing a valid order to be sent for potential execution.

As stated previously, current Order Corruption PS systems view orders in transit. Under the new proposed systems and methods, the PS system can be the target for order flow from the ATS system. For example, the MAC address and IP address can ensure that the order is targeted at the PS system. Accordingly, because the PS system is the target for the order flow, it thus gives it an added responsibility to deal with the onward transit of order messages to the liquidity venue.

Figure 16:
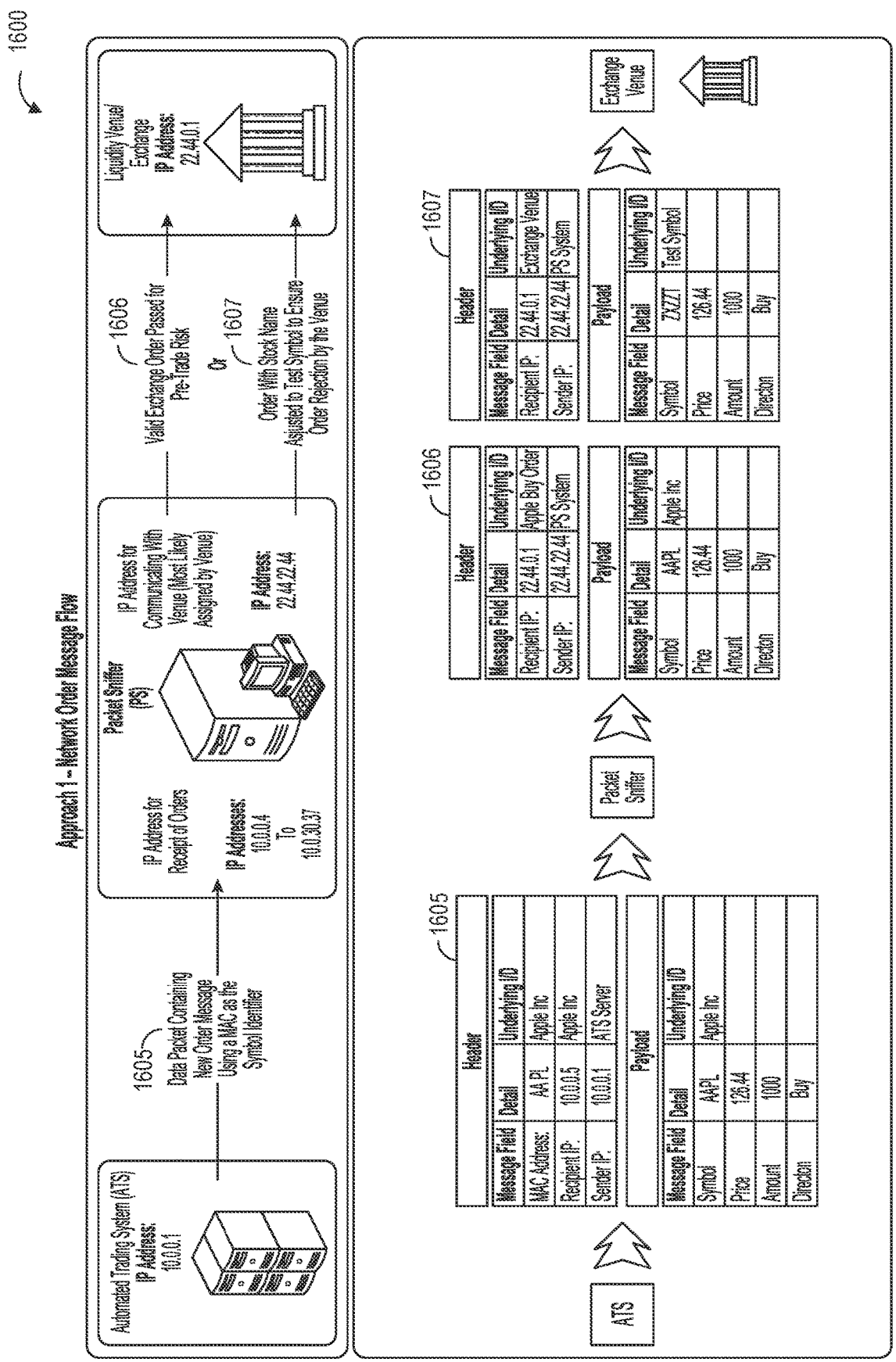
FIG. 16 illustrates an example network order message flow, in accordance with an embodiment of the present disclosure.

FIG. 16 provides an example scenario 1600 with an example network order message flow for Approach 1, according to an embodiment of the present disclosure. For a valid order that is within pre-trade risk parameters utilizing Approach 1, the order message as received from the ATS (1605) would need to be reformatted to that shown in 1606. The PS system would then convert the order from an electrical signal back to an optical signal and forward this message to the venue listed within the payload of the data packet.

Figure 17:
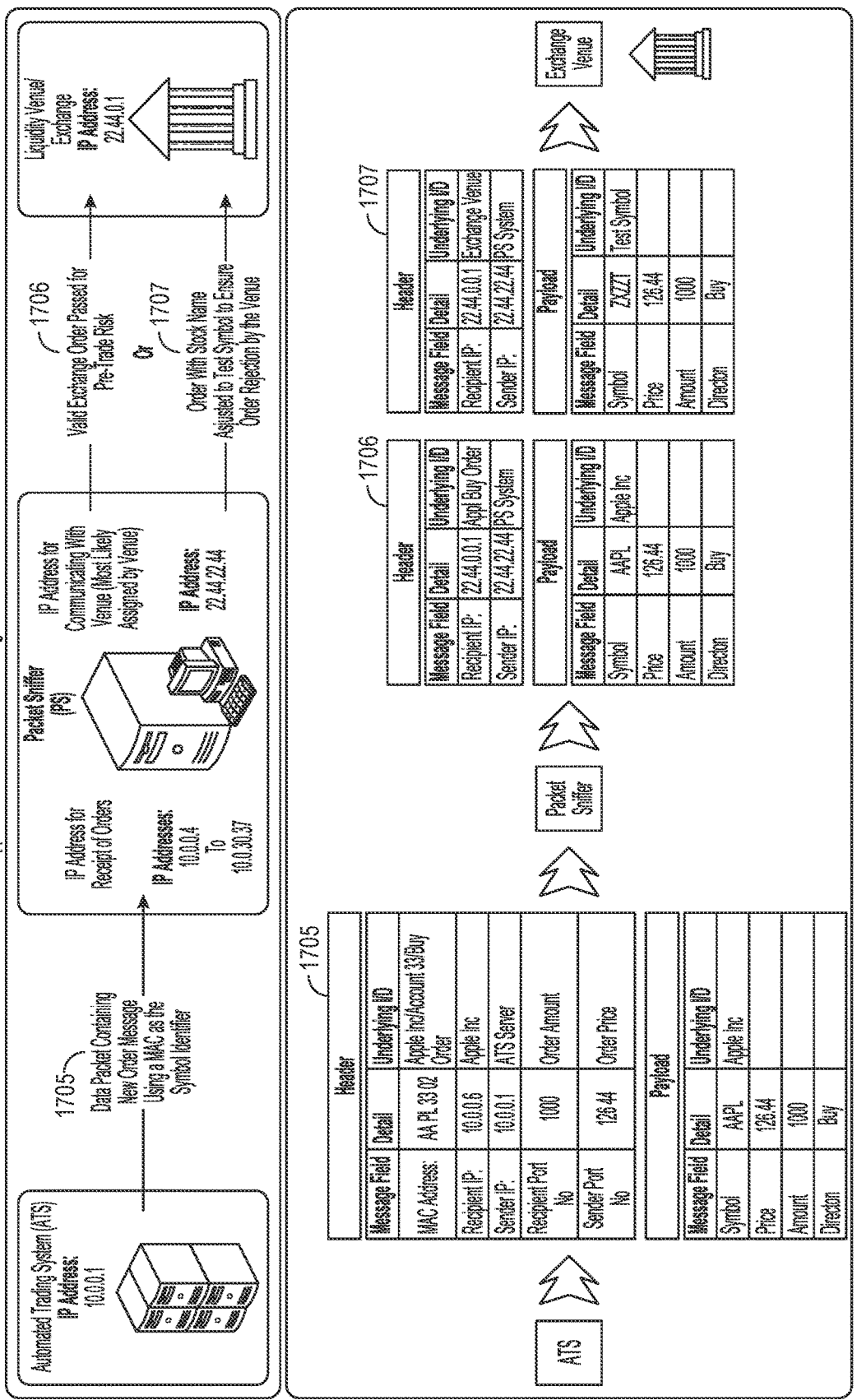
FIG. 17 illustrates an example network order message flow, in accordance with an embodiment of the present disclosure.

FIG. 17 provides an example scenario 1700 with an example network order message flow for Approach 2, according to an embodiment of the present disclosure. For a valid order that is within pre-trade risk parameters utilizing Approach 2, the order message as received from the ATS (1705) would again need to be reformatted to that shown in 1706. The PS system could then convert the order from an electrical signal back to an optical signal and to forward this message to the venue listed within the conversion table file in FIG. 15.

For an order that was not deemed to be valid, e.g., that had failed its pre-trade risk criteria, the system could prevent the order being sent as generated by the ATS system. For Approach 1 (FIG. 16), the order message as received from the ATS (1605) would be reformatted to that shown in 1607. Essentially, the intended symbol to be traded would be substituted for a test symbol (As shown in FIG. 14—Symbol ZXZZT) within the relevant liquidity venue and the target MAC and IP address would be changed to that of the liquidity venue. The PS system could then convert the order from an electrical signal back to an optical signal and forward this message to the venue listed within the payload of the data packet. Upon receipt of the test order symbol, the liquidity venue would enter this order as a test order that could not result in a valid trade.

For Approach 2, as shown in FIG. 17, the order message as received from the ATS (1705) could be reformatted to that shown in 1707. Again, the intended symbol to be traded would be substituted for a test symbol (as shown in FIG. 15) (ZXZZT) within the data packet payload. In addition, the target MAC and IP address could be changed to that of the liquidity venue. This would thus remove the trade elements from the order header and the payload would list the trade elements to be read by the liquidity venue. The PS system could convert the order from an electrical signal back to an optical signal and to forward this message to the venue. As per Approach 1, upon receipt of the test order symbol, the liquidity venue would again enter this order as a test order that could not result in a valid trade.

Figure 18:
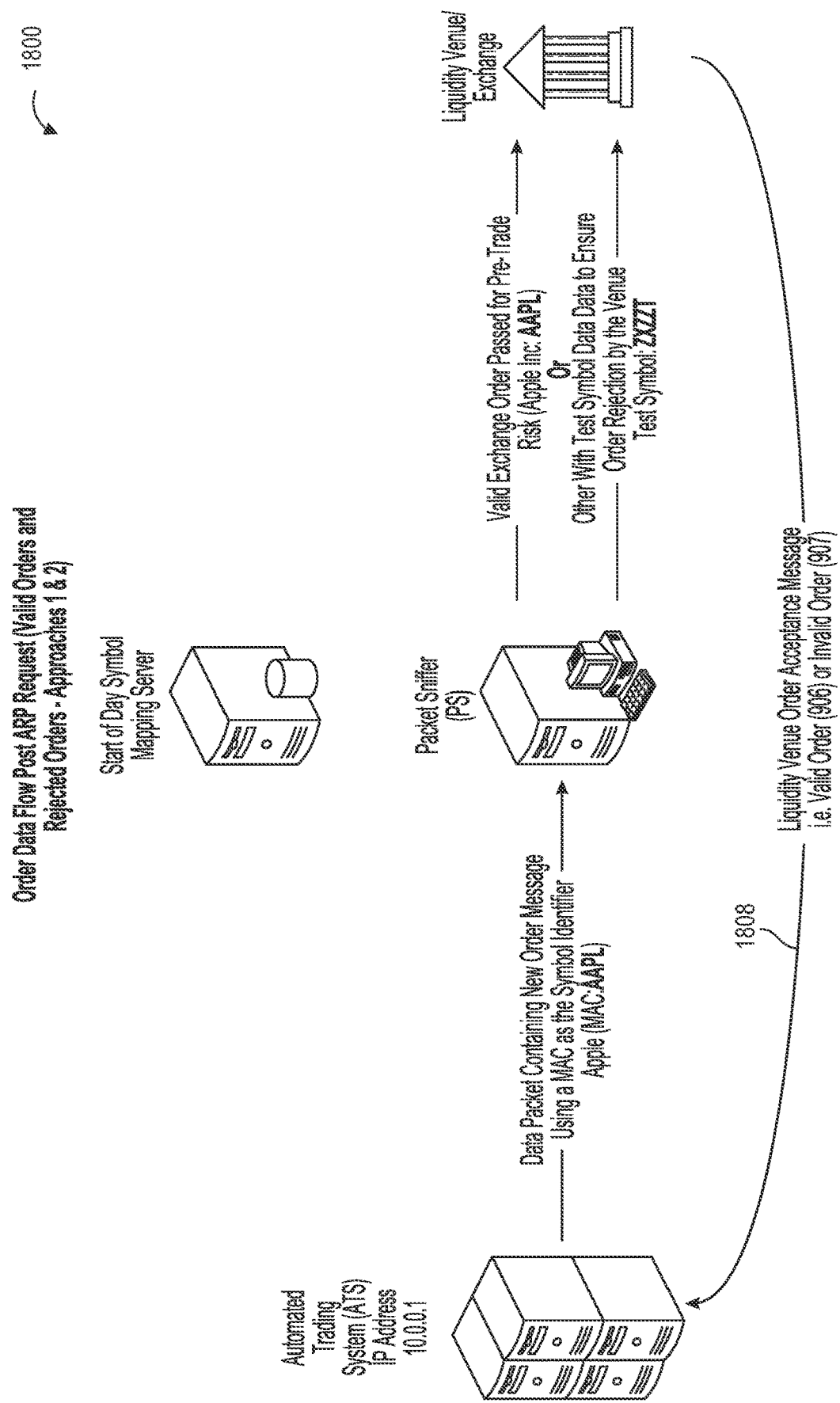
FIG. 18 illustrates an example scenario associated with liquidity venue order receipt feedback, in accordance with an embodiment of the present disclosure.

FIG. 18 shows an example scenario 1800 for handling of rejected orders for both Approaches 1 and 2, according to an embodiment of the present disclosure. Upon receipt of the test order, an order acknowledgement would be sent back to the ATS from the liquidity venue (1808) notifying the ATS that the original order ID sent by the ATS had now been accepted as a test order. This would allow the ATS to update its own order book by recognizing that the intended order had been converted to a test order and had thus breached its pre-trade risk limits. Valid, unchanged orders would also result in an order acknowledgement from the liquidity venue to the ATS, but the order acknowledgement would include the original symbol generated by the ATS, and not the test order symbol.

Current Disclosure Latency Improvements

Due to the fact that the protocols within the network stack can be precisely defined in terms of their physical size, i.e., in terms of Bytes/bits, and equally because current payload sizes as defined by the protocols of the liquidity venue can also be gauged, this means that the operational latency of a PS system to process orders from a 10 Gb Ethernet can also be precisely measured. Consequently, the latency improvement of operating Approach 2 of the present disclosure can be calculated and compared with existing PS system inspection methods, as described in the following paragraphs.

A 10 Gb Ethernet link operates at a frequency of 156.25 MHz. It can thus be calculated that, when connected to a 10 Gb Ethernet operating at a frequency of 156.25 MHz, a PS system will consume 64 bits of data every 6.4 ns (whereby 156.25 is the frequency and the reciprocal is $6.4 \times 10^6$). Therefore, when a comparison is made using the Tokyo Stock Exchange Arrowhead protocol as an example, the latency of a data packet inspected by a current FPGA PS system using a traditional buffered symbol substitution inspection method (as per FIG. 4B) can be calculated as follows:

| Existing Inspection Method | | |
|---|---|---|
| Arrowhead Data Packet | Bytes | bits = (Bytes x 8) |
| Ethernet | 14 | 112 |
| IP | 28 | 224 |
| TCP | 24 | 192 |
| Maximum Payload (up to identifying the order elements) | 75 | 600 |
| Total | 141 | 1128 |
| Latency = (Total bits/64 bits) * 6.4 ns | | |
| Latency = | | 112.8 ns |

As shown in FIG. 4B, the actual overall latency of an existing symbol substitution PS system using a buffered inspection process is actually 362.8 ns in total, which can be calculated as follows:

1. 250 ns=Physical time to convert the order from an optical signal to an electrical signal and then back to an optical signal Plus 2. 112.8 ns=Time taken to buffer and inspect the order.

Total=362.8 ns

In a theoretical comparison, the latency of inspecting an order for pre-trade risk via the new Approach 2 data packet structure method (as per FIG. 19), but still utilizing an existing buffered inspection procedure can be calculated as follows:

| Disclosed Method (Approach 2) | | |
|---|---|---|
| Arrowhead Data Packet | Bytes | bits |
| Ethernet | 14 | 112 |
| IP | 28 | 224 |
| TCP | 24 | 192 |
| Payload (not inspected) | 0 | 0 |
| Total | 66 | 528 |
| Latency = (Total bits/64 bits) * 6.4 ns | | |
| Latency = | | 52.8 ns |

As shown in FIG. 5A, the overall latency of a symbol substitution PS system using a buffered inspection process on an Approach 2 data packet structure could be calculated as follows:
1. 250 ns=Physical time to convert the order from an optical signal to an electrical signal and then back to an optical signal.
Plus
2. 52.8 ns=Time taken to buffer and inspect the order.
Total=302.8 ns Therefore, in terms of the actual order inspection procedure, the new Approach 2 data packet construction method equates to an improvement of approximately 53% over the existing latency inherent within existing Symbol Substitution PS system inspection methodologies (when existing PS systems are required to buffer and inspect the payload for the order details).

However, given that the new Approach 2 would ordinarily not require the order to be buffered, the actual latency added by the inspection procedure via the new Approach 2 would be zero, as the order could be read in transit and there would be no additional latency added to the overall PS system procedure. Consequently, the overall latency of the new Approach 2 would be 250 ns (the physical time to convert the order from an optical signal to an electrical signal and then back to an optical signal—as shown in FIG. 5A). This latency would therefore be equal to that of existing Order Corruption PS systems (as shown in FIG. 4A) and this would be a consistent and deterministic latency figure regardless of the protocol published by the liquidity venue.

For Approach 1, precise latency measurements cannot be made of the whole order inspection method due to the fact that some fields within typical pre-trade risk inspection procedures would still be listed within the payload rather than the network protocols, e.g., price, amount, direction etc. Accordingly, the precise time to inspect each of these fields cannot not be ascertained because there are no means to guarantee when they would be analyzed within the payload and the entire order would still need to be buffered until they were inspected. Furthermore, the protocol used by the liquidity venue could differ and this would also affect the latency. However, given that, as previously stated, the primary latency added within current inspection procedures accrues from looking up the symbol within the data packet payload, it is foreseen that Approach 1 would still offer significant latency improvements over existing (buffered) Symbol Substitution PS systems as currently exist, in which the symbol is located in the data packet payload. The latency of merely looking up the symbol within the MAC address of the data packet can be separately calculated as follows:

| Disclosed Method (Approach 1-Symbol Only Inspection) | | |
|---|---|---|
| Arrowhead Data Packet | Bytes | bits |
| Ethernet | 14 | 112 |
| IP (not inspected) | 28 | 0 |
| TCP (not inspected) | 24 | 0 |
| Payload (not inspected) | 75 | 0 |
| Total | 141 | 112 |
| Latency = (Total bits/64 bits) * 6.4 ns | | |
| Latency = | | 11.2 ns |

Therefore, in a theoretical comparison in which a PS system was only required to inspect the Symbol for determining whether the ATS was cleared for pre-trade risk, the Approach 1 data packet construction would (under an existing order buffering method using the ArrowNet protocol) add only 11.2 ns to the physical PS system procedure (250 ns) (i.e., 261.2 ns in total). This is in comparison to an existing order substitution data packet which could at best add 53.6 ns (303.6 ns total) or at worst add 112.8 ns (362.8 ns total) when the symbol is located within the data packet pay load. However, in this theoretical example, as per Approach 2, if the order symbol was the only item being inspected for pre-trade risk, there would actually be no requirement to buffer the whole order and in this respect the latency added to the existing PS system function via Approach 1 would be zero. In other words, the entire latency of Approach 1 would be 250 ns (the physical time to convert the order from an optical signal to an electrical signal and then back to an optical signal).

Overall therefore, significant latency reductions are shown using the Approach 1 data packet construction method and the lowest possible physical latency when using a PS system via the Approach 2 data packet construction method (when utilizing network protocols as currently exist and operate).

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The systems and methods disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the systems and methods disclosed herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the systems and methods disclosed herein may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

Any software, circuitry and/or components described herein may also include and/or utilize one or more types of non-transitory or transitory computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs") such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise" "comprising," and the like are to be construed in an inclusive sense as opposed to an exclusive or exhaustive sense: that is to say in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A computer-implemented method comprising:
   receiving, by a computing system, a market order data packet, wherein
   the market order data packet comprises order information for a market order to be made at a liquidity venue,
   the market order data packet comprises a header portion and a payload portion, and
   the header portion comprises at least a portion of the order information, wherein the order information in the header portion comprises at least an order symbol information;
   determining, by the computing system, an order symbol based on the order symbol information in the header portion;
   retrieving, by the computing system, risk parameters associated with the order symbol;
   determining, by the computing system, whether a risk threshold is exceeded based on the risk parameters and the order information; and
   generating, by the computing system, a final market order data packet for transmission to the liquidity venue based on the determining whether the risk threshold is exceeded.

2. The computer-implemented method of claim 1, wherein
   the header portion comprises an assigned Media Access Control (MAC) address, and
   the assigned MAC address comprises the order symbol information.

3. The computer-implemented method of claim 1, wherein the generating the final market order data packet comprises replacing the at least the portion of the order information in the header portion with liquidity venue address information.

4. The computer-implemented method of claim 1, further comprising retrieving the order information from the payload portion, wherein
   the determining the order symbol based on order symbol information in the header portion occurs prior to the retrieving the order information from the payload portion.

5. The computer-implemented method of claim 1, wherein the header portion further comprises at least one of order direction information, order price information, and order amount information.

6. The computer-implemented method of claim 5, wherein
   the header portion comprises an assigned MAC address, and
   the assigned MAC address comprises the order symbol information and the order direction information.

7. The computer-implemented method of claim 6, wherein
   the header portion comprises customized Transmission Control Protocol (TCP) port information, and
   the customized TCP port information comprises the order amount information and the order price information.

8. The computer-implemented method of claim 6, wherein the assigned MAC address further comprises sub-account information.

9. The computer-implemented method of claim 6, further comprising:
   receiving a conversion table file comprising a plurality of order symbols associated with a plurality of assigned MAC addresses.

10. A system comprising:
    at least one processor; and
    a memory storing instructions that, when executed by the at least one processor, cause the system to perform a method comprising:
    receiving a market order data packet, wherein
    the market order data packet comprises order information for a market order to be made at a liquidity venue,
    the market order data packet comprises a header portion and a payload portion, and
    the header portion comprises at least a portion of the order information, wherein the order information in the header portion comprises at least an order symbol information;
    determining an order symbol based on the order symbol information in the header portion;
    retrieving risk parameters associated with the order symbol;
    determining whether a risk threshold is exceeded based on the risk parameters and the order information; and
    generating a final market order data packet for transmission to the liquidity venue based on the determining whether the risk threshold is exceeded.

11. The system of claim 10, wherein
    the header portion comprises an assigned Media Access Control (MAC) address, and
    the assigned MAC address comprises the order symbol information.

12. The system of claim 10, wherein the generating the final market order data packet comprises replacing the at least the portion of the order information in the header portion with liquidity venue address information.

13. The system of claim 10, wherein the method further comprises retrieving the order information from the payload portion, wherein the determining the order symbol based on order symbol information in the header portion occurs prior to the retrieving the order information from the payload portion.

14. The system of claim 10, wherein the header portion further comprises at least one of order direction information, order price information, and order amount information.

15. The system of claim 14, wherein
the header portion comprises an assigned MAC address, and
the assigned MAC address comprises the order symbol information and the order direction information.

16. A non-transitory computer-readable storage medium including instructions that, when executed by at least one processor of a computing system, cause the computing system to perform a method comprising:
receiving a market order data packet, wherein
the market order data packet comprises order information for a market order to be made at a liquidity venue,
the market order data packet comprises a header portion and a payload portion, and
the header portion comprises at least a portion of the order information, wherein the order information in the header portion comprises at least an order symbol information;
determining an order symbol based on the order symbol information in the header portion;
retrieving risk parameters associated with the order symbol;
determining whether a risk threshold is exceeded based on the risk parameters and the order information; and
generating a final market order data packet for transmission to the liquidity venue based on the determining whether the risk threshold is exceeded.

17. The non-transitory computer-readable storage medium of claim 16, wherein
the header portion comprises an assigned Media Access Control (MAC) address, and
the assigned MAC address comprises the order symbol information.

18. The non-transitory computer-readable storage medium of claim 16, wherein the generating the final market order data packet comprises replacing the at least the portion of the order information in the header portion with liquidity venue address information.

19. The non-transitory computer-readable storage medium of claim 16, wherein the method further comprises retrieving the order information from the payload portion, wherein
the determining the order symbol based on order symbol information in the header portion occurs prior to the retrieving the order information from the payload portion.

20. The non-transitory computer-readable storage medium of claim 16, wherein the header portion further comprises at least one of order direction information, order price information, and order amount information.

* * * * *